(12) United States Patent
Aoki et al.

(10) Patent No.: US 8,894,542 B2
(45) Date of Patent: Nov. 25, 2014

(54) VEHICLE DRIVE SYSTEM

(75) Inventors: Jun Aoki, Saitama (JP); Takeshi Hoshinoya, Saitama (JP); Akihiro Yamamoto, Saitama (JP); Sei Shinohara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/818,282

(22) PCT Filed: Jun. 22, 2011

(86) PCT No.: PCT/JP2011/064314
§ 371 (c)(1),
(2), (4) Date: Feb. 21, 2013

(87) PCT Pub. No.: WO2012/026196
PCT Pub. Date: Mar. 1, 2012

(65) Prior Publication Data
US 2013/0150211 A1    Jun. 13, 2013

(30) Foreign Application Priority Data
Aug. 24, 2010  (JP) ................................ 2010-187541

(51) Int. Cl.
*B60W 10/02*    (2006.01)
(Continued)

(52) U.S. Cl.
CPC ......... *B60W 10/02* (2013.01); *B60W 30/18127* (2013.01); *Y02T 10/6217* (2013.01);
(Continued)

(58) Field of Classification Search
CPC ............. F16H 3/44; F16H 3/72; F16H 59/44; B60W 10/02; B60W 10/08; B60W 2510/08; B60W 2710/021

USPC ........ 475/2, 5, 8, 151, 153; 477/5, 8, 14, 175, 477/180
See application file for complete search history.

(56) References Cited

U.S. PATENT DOCUMENTS

| 5,419,406 A | 5/1995 | Kawamoto et al. |
| 5,509,491 A * | 4/1996 | Hall, III ........................ 180/9.44 |

(Continued)

FOREIGN PATENT DOCUMENTS

| CN | 101055021 A | 10/2007 |
| EP | 1 142 743 A2 | 10/2001 |

(Continued)

OTHER PUBLICATIONS

International Search Report, PCT/JP2011/064314 dated Aug. 9, 2011.

(Continued)

*Primary Examiner* — Edwin A Young
(74) *Attorney, Agent, or Firm* — Westerman, Hattori, Daniels & Adrian, LLP

(57) ABSTRACT

A rear-wheel drive system includes motors for generating driving force to drive a vehicle, hydraulic brakes on power transmission lines between the motors and rear wheels switching a motors side and a wheels side to a connected state or a disconnected state, an ECU controlling the motors and the brakes and a one-way clutch in parallel with the hydraulic brakes on the transmission line configured to be engaged when a forward rotational power on the motors side is inputted into the wheels side and disengaged when a backward rotational power on the motors side is inputted into the wheels side and vice versa. The ECU causes the hydraulic brakes to be applied so as to put the motors side and the wheels side in the connected state when the forward rotational power on the motors side is inputted into the wheels side.

19 Claims, 22 Drawing Sheets

(51) Int. Cl.
- *B60W 10/08* (2006.01)
- *F16H 3/72* (2006.01)
- *B60K 7/00* (2006.01)
- *B60K 6/46* (2007.10)
- *B60K 17/04* (2006.01)
- *B60K 17/356* (2006.01)
- *B60K 6/52* (2007.10)
- *B60W 30/18* (2012.01)
- *B60W 20/00* (2006.01)
- *B60W 10/16* (2012.01)

(52) U.S. Cl.
CPC ....... *B60K 7/0007* (2013.01); *B60K 2007/0046* (2013.01); *B60K 2007/0092* (2013.01); *B60K 6/46* (2013.01); *B60K 17/046* (2013.01); *B60K 17/356* (2013.01); *Y02T 10/7258* (2013.01); *B60W 20/1062* (2013.01); *B60W 10/16* (2013.01); *Y02T 10/6265* (2013.01); *B60K 6/52* (2013.01); *B60W 20/00* (2013.01)
USPC ........................................ 477/5; 477/8; 475/8

(56) References Cited

U.S. PATENT DOCUMENTS

| | | | |
|---|---|---|---|
| 6,024,182 | A | 2/2000 | Hamada et al. |
| 6,105,704 | A | 8/2000 | Hamada et al. |
| 6,248,036 | B1 * | 6/2001 | Masaki .............................. 475/2 |
| 6,325,736 | B1 | 12/2001 | Hamada et al. |
| 7,264,568 | B2 * | 9/2007 | Ludwig et al. ................ 475/233 |

FOREIGN PATENT DOCUMENTS

| | | |
|---|---|---|
| JP | 06-63940 U | 9/1994 |
| JP | 09-079348 A | 3/1997 |
| JP | 11-099838 A | 4/1999 |
| JP | 2004-088984 A | 3/2004 |
| JP | 2006-258279 A | 9/2006 |
| JP | 2008-162493 A | 7/2008 |

OTHER PUBLICATIONS

Chinese Office Action with English translation issued Mar. 4, 2014 in corresponding Chinese Patent Application No. 201180040113.9.
European Search Report issued Apr. 11, 2014 in corresponding EP Patent Application No. 11819668.27.

* cited by examiner

| VEHICLE STATE | FRONT UNIT | REAR UNIT | REAR MOTOR | EOP | SOL | OWC | BRK |
|---|---|---|---|---|---|---|---|
| STOPPED | × | × | STOPPED | OFF | OFF | OFF | OFF |
| FORWARD TRAVELING (AT LOW SPEED) | × | ○ | POWER DRIVEN | Lo | OFF | ON | ON WEAKLY APPLIED |
| FORWARD TRAVELING (AT MIDDLE SPEED) | ○ | × | STOPPED | Lo | OFF | OFF | ON WEAKLY APPLIED |
| REGENERATIVE DECELERATION | ○ | ○ | DRIVEN FOR REGENERATION | Hi | OFF | OFF | ON |
| ACCELERATED | ○ | ○ | POWER DRIVEN | Lo | OFF | ON | ON WEAKLY APPLIED |
| FORWARD TRAVELING (AT HIGH SPEED) | ○ | × | STOPPED | Lo | ON | OFF | OFF |
| REVERSED | × | ○ | BACKWARD POWER DRIVEN | Hi | OFF | OFF | ON |

VEHICLE DRIVE SYSTEM

CROSS-REFERENCE TO RELATED APPLICATIONS

This application is a National Stage entry of International Application No. PCT/JP2011/064314, filed Jun. 22, 2011, which claims priority to Japanese No. 2010-187541, filed Aug. 24, 2010. The disclosures of the prior applications are hereby incorporated in their entirety by reference.

TECHNICAL FIELD

The present invention relates to a vehicle drive system that includes a motor for generating driving force to drive a vehicle and a hydraulic connecting/disconnecting unit that is provided on a power transmission line defined between the motor and wheels for connecting or disconnecting the transmission of power therebetween.

BACKGROUND ART

In a vehicle described in Patent Literature 1, as shown in FIG. 25, front wheels are designed to be driven by a main drive source such as an engine (both the wheels and the engine being not shown), and rear wheels 102 of the vehicle 100 are designed to be driven by a motor 103, which is an auxiliary drive source, via a power transmission mechanism 104.

This power transmission mechanism 104 includes a reduction gear mechanism 105 into which power from the motor 103 is inputted and a differential gear 106 that distributes the power outputted from the reduction gear mechanism 105 to the left and right rear wheels 102, 102. The reduction gear mechanism 105 includes a reduction gear train that is made up of a first gear 105a that is fixed to an output shaft of the motor 103, a second gear 105b that meshes with the first gear 105a and a third gear 105c that meshes with an input gear 106a of the differential gear 106. A hydraulic clutch 107 is provided between the second gear 105b and the third gear 105c. When the hydraulic clutch 107 is engaged, the second gear 105b and the third gear 105c are coupled together, whereby the power of the motor 103 can be transmitted to the rear wheels 102 via the power transmission mechanism 104. When the hydraulic clutch 107 is disengaged, the second gear 105b and the third gear 105c are decoupled from each other, whereby the transmission to the rear wheels 102 of power of the motor 103 is disconnected.

RELATED ART LITERATURE

Patent Literature

Patent Literature 1: JP-2006-258279-A

SUMMARY OF THE INVENTION

Problem that the Invention is to Solve

In the power transmission mechanism 104 described in Patent Literature 1, however, for the power of the motor 103 to be transmitted to the rear wheels 102, the hydraulic clutch 107 needs to be held in a large torque capacity state by engaging the hydraulic clutch 107 so strongly and rigidly as to enable the power transmission. Therefore, for example, when the temperature of fluid is low, there are fears that a delay in response is caused.

Additionally, when the motor 103 is actuated for regenerative deceleration from a state in which the motor 103 is stopped while the vehicle is being driven, the hydraulic clutch 107 needs to be engaged after a revolution speed control is carried out, leading to fears that a delay in response is caused.

The invention has been made in view of the problems described above, and an object thereof is to provide a vehicle drive system that can suppress the delay in response in transmitting power between a motor and wheels.

Means for Solving the Problem

To attain the object, aspects presented herein include a vehicle drive system (e.g., a rear-wheel drive system 1 in embodiment) including:

a motor (e.g., motors 2A, 2B, 2C in embodiment) that generates driving force to drive a vehicle;

a motor controller (e.g., an ECU 45 in embodiment) that controls the motor;

a connection/disconnection unit (e.g., hydraulic brakes 60A, 60B, 60 in embodiment) that is provided on a power transmission line between the motor and a wheel (e.g., rear wheels Wr, LWr, RWr in embodiment) and which puts a motor side and a wheel side in a connected state or a disconnected state by being applied or released; and a connection/disconnection unit controller (e.g., the ECU 45 in embodiment) that controls the connection/disconnection unit, the system further including:

a one-way transmission unit (e.g., a one-way clutch 50 in embodiment) that is provided in parallel with the connection/disconnection unit on the power transmission line between the motor and the wheel and which is configured so that the one-way transmission unit is put in an engaged state when a forward rotational power on the motor side is inputted into the wheel side and is put in a disengaged state when a backward rotational power on the motor side is inputted into the wheel side, while the one-way transmission unit is put in the disengaged state when a forward rotational power on the wheel side is inputted into the motor side and is put in the engaged state when a backward rotational power on the wheel side is inputted into the motor side, wherein the connection/disconnection unit controller causes the connection/disconnection unit to be applied so as to put the motor side and the wheel side in the connected state when the forward rotational power on the motor side is inputted into the wheel side.

Aspects may further include that the connection/disconnection unit controller causes the connection/disconnection unit to be applied so as to put the motor side and the wheel side in the connected state when the forward rotational power on the wheel side is inputted into the motor side.

Aspects may further include that the motor controller controls the motor to be put in a regenerative drive state when the forward rotational power on the wheel side is inputted into the motor side.

Aspects may further include that in addition to switching between the connected state and the disconnected state, the connection/disconnection unit controller can control an application force by which the connection/disconnection unit is applied when in an applied state, that the motor controller controls the motor to be put in the regenerative drive state or a non-drive state when the forward rotational power on the wheel side is inputted into the motor side, and that the connection/disconnection unit controller controls an application force of the connection/disconnection unit when the motor is in the non-drive state so as to be weaker than an application force of the connection/disconnection unit when the motor is in the regenerative drive state.

Aspects may further include that the motor controller controls the motor to be put in the regenerative drive state when the forward rotational power on the wheel side is inputted into the motor side, that in addition to switching between the connected state and the disconnected state, the connection/disconnection unit controller can control an application force by which the connection/disconnection unit is applied when in an applied state, and that the connection/disconnection unit controller controls an application force of the connection/disconnection unit when the forward rotational power on the motor side is inputted into the wheel side so as to be weaker than an application force of the connection/disconnection unit when the forward rotational power on the wheel side is inputted into the motor side and the motor controller controls the motor to be put in the regenerative drive state.

Aspects may further include that the connection/disconnection unit controller causes the connection/disconnection unit to be applied so as to put the motor side and the wheel side in the connected state when the backward rotational force on the motor side is inputted into the wheel side.

Aspects may further include that in addition to switching between the connected state and the disconnected state, the connection/disconnection unit controller can control an application force by which the connection/disconnection unit is applied when in an applied state, and that the connection/disconnection unit controller controls an application force of the connection/disconnection unit when the forward rotational power on the motor side is inputted into the wheel side so as to be weaker than an application force of the connection/disconnection unit when the backward rotational power on the motor side is inputted into the wheel side.

Aspects may further include that the connection/disconnection unit is a hydraulic connection/disconnection unit that includes an oil chamber (e.g., a first hydraulic chamber S1, a second hydraulic chamber S2 in embodiment) where to reserve oil supplied by a hydraulic supply source (e.g., an electric oil pump 70 in embodiment), and that the connection/disconnection unit controller controls the application force of the connection/disconnection unit when in the applied state by adjusting a hydraulic pressure in the oil chamber by controlling an operating state of the hydraulic supply source.

Additionally, aspects presented herein include a vehicle drive system including:

a motor (e.g., motors 2A, 2B in embodiment) that generates driving force to drive a vehicle;

a motor controller (e.g., an ECU 45 in embodiment) that controls the motor;

a connection/disconnection unit (e.g., hydraulic brakes 60A, 60B in embodiment) that is provided on a power transmission line between the motor and the wheel and which puts a motor side and a wheel side in a connected state or a disconnected state by being applied or released; and a connection/disconnection unit controller (e.g., the ECU 45 in embodiment) that controls the connection/disconnection unit, the system further including:

a one-way transmission unit (e.g., a one-way clutch 50 in embodiment) that is provided in parallel with the connection/disconnection unit on the power transmission line between the motor and the wheel and which is configured so that the one-way transmission unit is put in an engaged state when a forward rotational power on the motor side is inputted into the wheel side and is put in a disengaged state when a backward rotational power on the motor side is inputted into the wheel side, while the one-way transmission unit is put in the disengaged state when a forward rotational power on the wheel side is inputted into the motor side and is put in the engaged state when a backward rotational power on the wheel side is inputted into the motor side, wherein the connection/disconnection unit controller causes the connection/disconnection unit to be applied so as to put the motor side and the wheel side in the connected state when the forward rotational power on the wheel side is inputted into the motor side and causes the connection/disconnection unit applied to be released when a vehicle speed reaches or exceeds a predetermined speed with the motor side and the vehicle side staying in the connected state.

Aspects may further include that the connection/disconnection unit is a hydraulic connection/disconnection unit that includes an oil chamber (e.g., a first hydraulic chamber S1, a second hydraulic chamber S2 in embodiment) where to reserve oil supplied by a hydraulic supply source (e.g., an electric oil pump 70 in embodiment), that the hydraulic supply source doubles as a supply source for a cooling medium for cooling the motor, and that the hydraulic supply source is prevented from stopping its operation when the connection/disconnection unit controller causes the connection/disconnection unit to be released.

Aspects may further include that a transmission (e.g., epicyclic reduction gears 12A, 12B in embodiment) that changes a revolution speed of the motor and a rotation speed of the wheel is provided on the power transmission line between the motor and the wheel, that the transmission is an epicyclic transmission that is made up of three rotational elements (e.g., sun gears 21A, 21B, planetary gears 23A, 23B, ring gears 24A, 24b in embodiment), and that the one-way transmission unit and the connection/disconnection unit are connected to a first rotational element (e.g., the ring gears 24A, 24B in embodiment) that is one of the three rotational elements of the transmission.

Aspects may further include that in the three rotational elements, the motor is connected to a second rotational element (e.g., the sun gears 21A, 21B in embodiment), and the wheel is connected to a third rotational element (e.g., the planetary gears 23A, 23B in embodiment).

Aspects may further include that in the epicyclic transmission, the first rotational element is made up of a ring gear, the second rotational element is made up of a sun gear, and the third rotational element is made up of a carrier.

Aspects may further include that the motor includes a first and second motors which are disposed left and right in a width direction of the vehicle, that the rotational power of the first motor (e.g., a motor 2A in embodiment) is transmitted to a left wheel (e.g., a rear wheel LWr in embodiment), and that the rotational power of the second motor (e.g., a motor 2B in embodiment) is transmitted to a right wheel (e.g., a rear wheel RWr in embodiment).

Aspects may further include that the motor includes a first and second motors which are disposed left and right in a width direction of the vehicle, that the transmission includes a first and second transmissions which are disposed left and right in the width direction of the vehicle, the rotational power of the first motor (e.g., a motor 2A in embodiment) is transmitted to a left wheel (e.g., a rear wheel LWr in embodiment) via the first transmission (e.g., the epicyclic reduction gear 12A in embodiment), that the rotational power of the second motor (e.g., a motor 2B in embodiment) is transmitted to a right wheel (e.g., a rear wheel RWr in embodiment) via the second transmission (e.g., the epicyclic reduction gear 12B in embodiment), that the first motor and the first transmission are disposed in that order from an outer side in the width direction, and that the second motor and the second transmission are disposed in that order from an outer side in the width direction.

Aspects may further include that the one-way transmission unit and the connection/disconnection unit are connected to first rotational elements, which are like the first rotational element, of the first transmission and the second transmission.

Aspects may further include that the first rotational element of the first transmission and the first rotational element of the second transmission are coupled to each other.

Aspects may further include that the one-way transmission unit, which is single, is provided for the first rotational element of the first transmission and the first rotational element of the second transmission which are coupled together.

Aspects may further include that the connection/disconnection unit, which is single, is provided for the first rotational element of the first transmission and the first rotational element of the second transmission which are coupled together.

Advantage of the Invention

As the one-way transmission unit may be provided in parallel with the connection/disconnection unit, when the forward rotational power of the motor side is inputted into the wheel side, the one-way transmission unit is put in the engaged state, whereby it is possible to prevent a delay in response. Further, it is possible not only to decrease the application force of the connection/disconnection unit but also to shorten the application time.

In addition, in taking only the transmission of rotational power into consideration, when the forward rotational power on the motor side is inputted into the wheel side, the one-way transmission unit is put in the engaged state. Thus, the power transmission is enabled only by the one-way transmission unit. However, by putting the motor side and the wheel side in the connected state by applying the connection/disconnection unit in parallel, it is possible to suppress a risk of the power transmission being disabled due to the one-way transmission unit being put in the disengaged state as when the input of the forward rotational power from the motor side is temporarily decreased.

Additionally, when shifting the motor to the regenerative drive state (the state in which the forward rotational power on the wheel side is inputted into the motor side), the revolution speed of the motor and the rotation speed of the wheels do not have to be controlled to put the motor side and the wheel side in the connected state.

When the forward rotational power on the wheel side is inputted into the motor side, the one-way transmission unit is put in the disengaged state. Thus, it is not possible to enable the power transmission only by the one-way transmission unit. However, it is still possible to enable the power transmission by keeping the motor side and the wheel side in the connected state by applying the connection/disconnection unit which is provided in parallel with the one-way transmission unit.

The energy of the vehicle can be regenerated by controlling the motor to be put in the regenerative drive state after the connection/disconnection unit is applied to put the motor side and the wheel side in the connected state.

When the forward rotational power on the wheel side is inputted into the motor side, that is, when the one-way transmission unit is in the disengaged state, in the event that the motor is controlled to be put in the regenerative drive state in that state, a large load is generated in the motor due to regeneration. Therefore, the connection/disconnection unit needs to be applied strongly so as to keep the motor side and the wheel side in the connected state. On the other hand, when the motor is controlled to be put in the disengaged state, no large load is generated, and hence, the connection/disconnection unit does not have to be applied strongly. Thus, by making the application force of the connection/disconnection unit when the motor is controlled to be put in the disengaged state weaker than the application of the connection/disconnection unit when the motor is controlled to be put in the regenerative drive state, the consumed energy for application of the connection/disconnection unit can be decreased.

The construction may be adopted in which the one-way transmission unit and the connection/disconnection unit are provided in parallel. Therefore, it is possible to make the application force of the connection/disconnection unit when the forward rotational power on the motor side is inputted into the wheel side, that is, when the one-way transmission unit is in the engaged state weaker than the application force of the connection/disconnection unit when the forward rotational power on the wheel side is inputted into the motor side and the motor controller controls the motor to be put in the regenerative drive state, that is, when the one-way transmission unit in the disengaged state, thereby making it possible to decrease the consumed energy for application of the connection/disconnection unit.

The one-way transmission unit may be put in the disengaged state when the backward rotational power on the motor side is inputted into the wheel side, and it is not possible to enable the power transmission only by the one-way transmission unit. However, it is still possible to enable the power transmission by keeping the motor side and the wheel side in the connected state by applying the connection/disconnection unit that is provided in parallel with the one-way transmission unit, thereby making it possible to reverse the vehicle.

The construction may be adopted in which the one-way transmission unit and the connection/disconnection unit are provided in parallel. Therefore, it is possible to make the application force of the connection/disconnection unit when the forward rotational power on the motor side is inputted into the wheel side, that is, when the one-way transmission unit is in the engage state weaker than the application force of the connection/disconnection unit when the backward rotational power on the motor side is inputted into the wheel side, that is, when the one-way power transmission is in the disengaged state, thereby making it possible to decrease the consumed energy for application of the connection/disconnection unit.

By adopting the hydraulic connection/disconnection unit, the application force and the surface areas to which the application force is applied can be controlled in accordance with the configurations and/or constructions of the oil paths and the oil chambers (the brake oil chambers).

As the one-way transmission unit may be provided in parallel with the connection/disconnection unit, when the forward rotational power on the motor side is inputted into the wheel side, the one-way transmission unit is put in the engaged state, whereby it is possible to prevent a delay in response. Further, it is possible not only to decrease the application force of the connection/disconnection unit but also to shorten the application time.

Further, by applying the connection/disconnection unit so that the motor side and the wheel side are put in the connected state when the forward rotational power on the wheel side is inputted into the motor side and releasing the applied connection/disconnection unit when the vehicle speed reaches or exceeds a predetermined speed with the connection/disconnection unit left in the applied state, the overspeeding of the motor can be prevented.

By adopting the hydraulic connection/disconnection unit, it is possible to adjust the application force or the surface area to which the application force is applied in accordance with the shape and construction of an oil path or oil chamber (brake oil chamber). In addition, since the hydraulic supply source doubles as the supply source of the cooling medium for cooling the motor, no separate cooling medium supply source has to be provided. Further, by adopting the configuration in which the operation of the hydraulic supply source is not stopped when the connection/disconnection unit controller causes the connection/disconnection unit to be released, it is possible to continue cooling the motor.

The output properties of the motor and the wheels can be adjusted. Additionally, by adopting the epicyclic transmission, the transmission can be made smaller in size. Further, by connecting the one-way transmission unit and the connection/disconnection unit to one rotational element of the three rotational elements, the one-way transmission unit and the connection/disconnection unit can be made to function in parallel.

By connecting the one-way transmission unit and the connection/disconnection unit to the rotation element to which neither the motor nor the wheels are connected, the degree of freedom in arranging the one-way transmission unit and the connection/disconnection unit is increased.

By connecting the one-way transmission unit and the connection/disconnection unit to the ring gear that is a circumferentially outermost element of the three elements of the planetary gear mechanism and which lies close to a housing (case) of the transmission, the degree of freedom in placing the one-way transmission unit and the connection/disconnection unit is increased.

As the motors may be disposed one for each of the left and right wheels, it is possible to enhance the steering stability and the turning performance by controlling independently the left and right wheels. Additionally, when compared with a case where the left and right wheels are driven by a single motor and a differential, the controllability is increased, and the loss can be suppressed.

The motor and the transmission may be disposed in that order from the outer side in the width direction on both the left- and right-hand sides of the vehicle, thereby making it possible to disposed the left and right transmissions so as to lie near to each other. Thus, it is possible not only to dispose the transmissions in a common housing (case) but also to commonize the lubrication of the transmissions, thereby making it possible to enhance the vehicle mounting performance of the transmissions.

By connecting the one-way transmission unit and the connection/disconnection unit to one rotational element of the three rotational elements, it is possible to make the one-way transmission unit and the connection/disconnection unit function in parallel.

By coupling together one rotational element of the three rotational elements making up the left transmission and one rotational element of the three rotational elements making up the right transmission, it is possible to use a control member for controlling these rotational elements in common, thereby making it possible to realize a reduction in size and weight of a drive unit and a reduction in the number of components involved.

As only the single one-way transmission unit may be provided for the left and right transmissions, it is possible to realize a reduction in size and weight of the drive unit and a reduction in the number of components involved.

As only the single connection/disconnection unit may be provided for the left and right transmissions, it is possible to realize a reduction in size and weight of the drive unit and a reduction in the number of components involved.

BRIEF DESCRIPTION OF THE DRAWINGS

FIG. 13 is a table depicting a relation between a front-wheel drive system and the rear-wheel drive system in various vehicle states together with operating states of motors and states of a hydraulic circuit.

MODE FOR CARRYING OUT THE INVENTION

Firstly, one embodiment of a vehicle drive system according to the invention will be described based on FIGS. 1 to 4.

Figure 1:
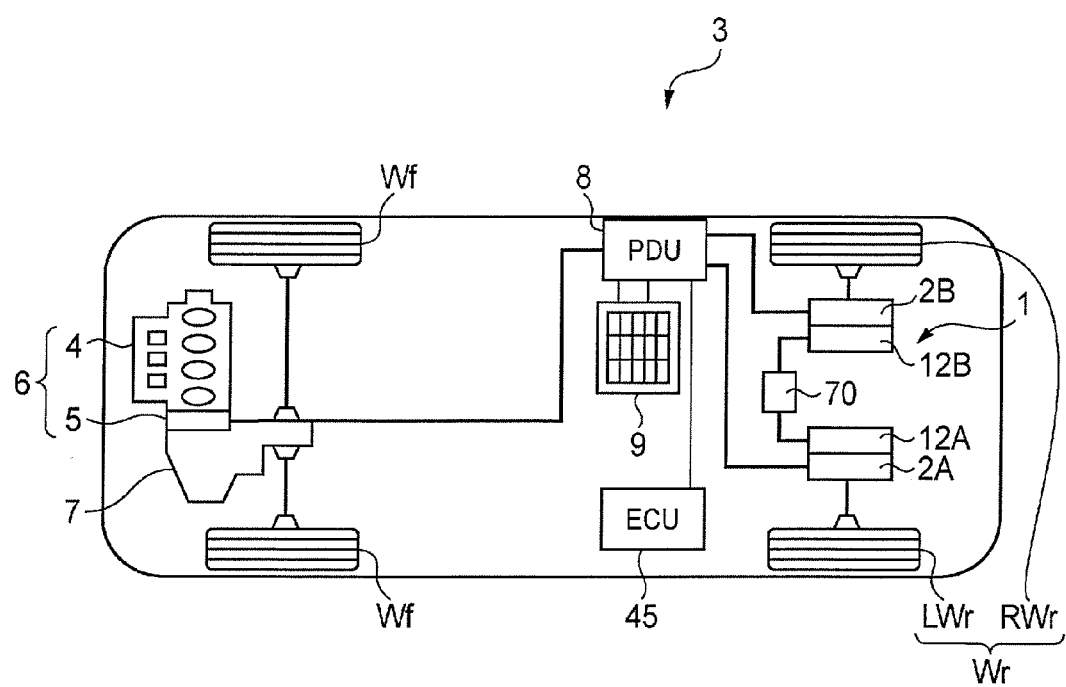
FIG. 1 is a block diagram showing a schematic configuration of a hybrid vehicle which constitutes an embodiment of a vehicle in which a vehicle drive system according to the invention can be mounted.

A vehicle drive system according to the invention is such as to use motors as drive sources for driving rear axles and is used in a vehicle incorporating a drive system shown in FIG. 1. In the following description, the vehicle drive system will be described as being used as a rear-wheel drive system. However, the vehicle drive system of the invention may be used for a front-wheel drive system.

A vehicle 3 shown in FIG. 1 is a hybrid vehicle having a drive system 6 (hereinafter, referred to as a front-wheel drive system) in which an internal combustion engine 4 and a motor 5 are connected in series at a front part of the vehicle. Power of this front-wheel drive system 6 is transmitted to front wheels Wf via a transmission 7, while power of a drive system 1 (hereinafter, referred to as a rear-wheel drive system) that is provided at a rear part of the vehicle separately from the front-wheel drive system 6 is designed to be transmitted to rear wheels Wr (RWr, LWr). The motor 5 of the front-wheel drive system 6 and motors 2A, 2B of the rear-wheel drive system 1 on a rear wheel Wr side are connected to a battery 9 via a PDU 8 (Power Drive unit), so that electric power supply from the battery 9 and energy regeneration to the battery 9 are designed to be implemented via the PDU 8. The PUD 8 is connected to an ECU 45, which will be described later.

Figure 2:
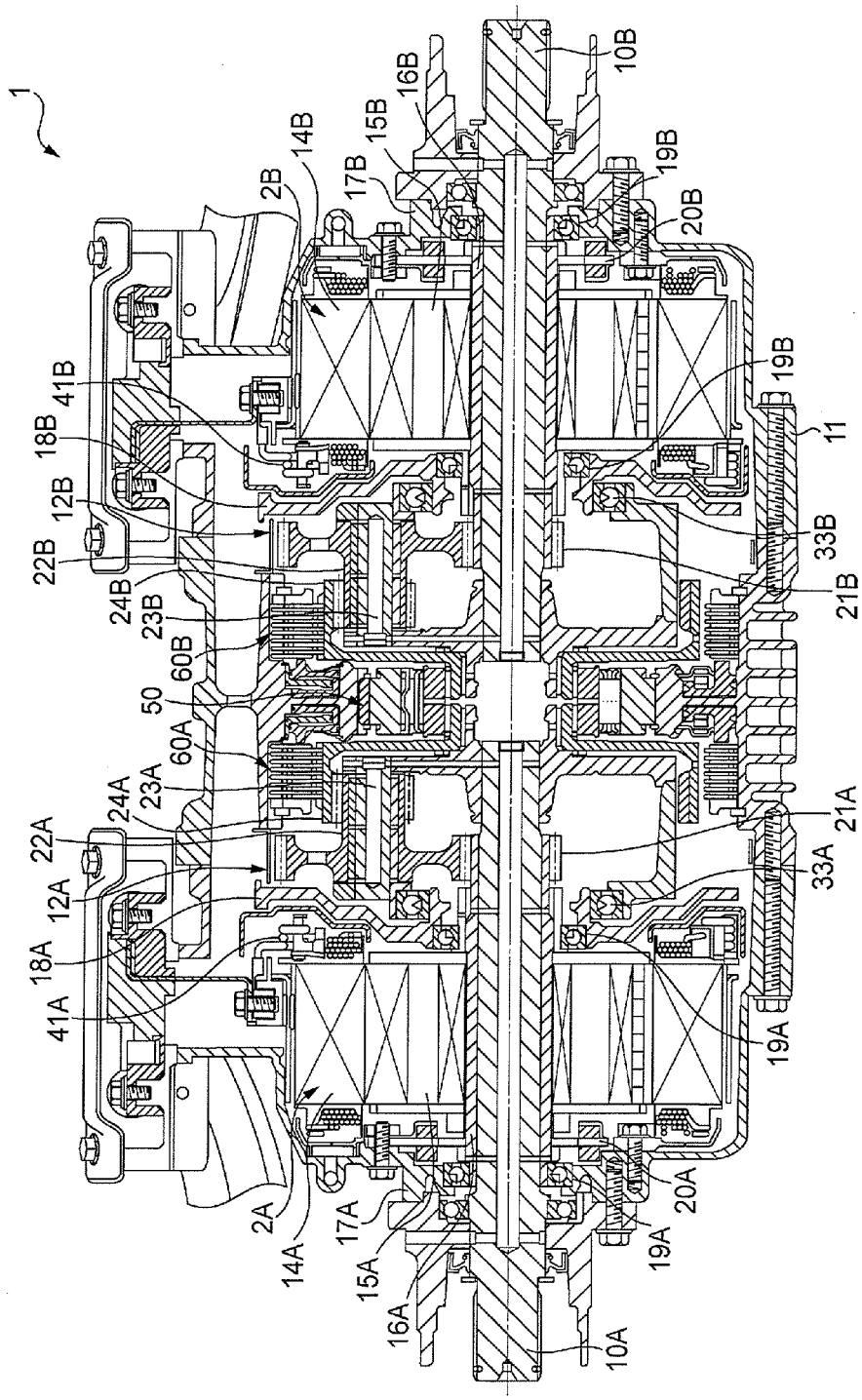
FIG. 2 is a vertical sectional view of a rear-wheel drive system of a first embodiment.
Figure 4:
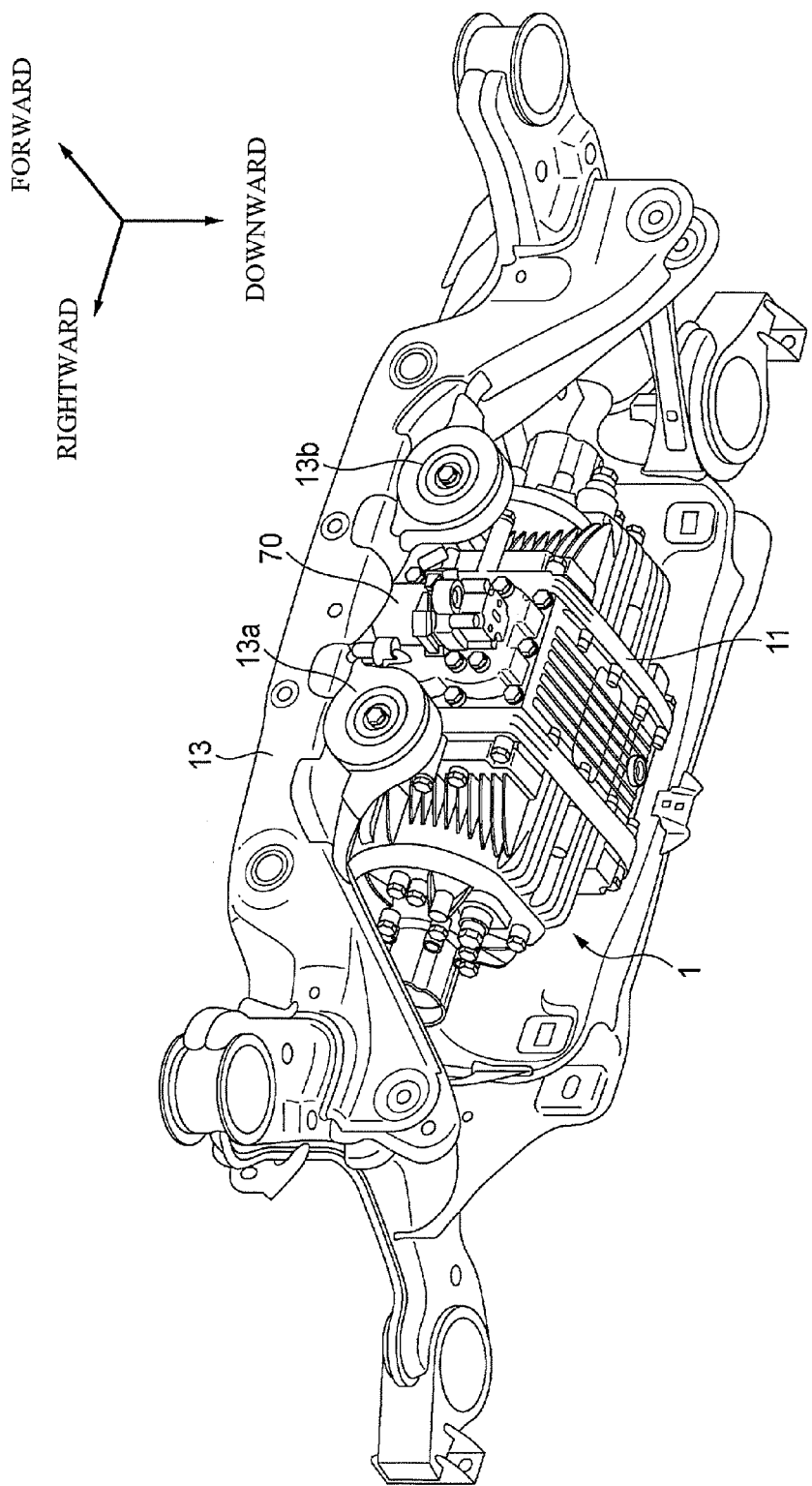
FIG. 4 is a perspective view showing a state in which the rear-wheel drive system is mounted on a frame.

FIG. 2 is an overall vertical sectional view of the rear-wheel drive system 1. In the same figure, reference numerals 10A, 10B denote left and right axles of the rear wheels Wr of the vehicle, and the left and right axles are disposed coaxially in a vehicle's width direction. A reduction gear case 11 of the rear-wheel drive system 1 is formed into a substantially cylindrical shape in whole. The axle driving motors 2A, 2B and epicyclic reduction gears 12A, 12B that decrease the driving revolution speeds of the motors 2A, 2B are disposed concentrically with the axles 10A, 10B in an interior of the reduction gear case 11. The motor 2A and the epicyclic reduction gear 12A control a left rear wheel LWr, and the motor 2B and the epicyclic reduction gear 12B control a right rear wheel RWr. The motor 2A and the epicyclic reduction gear 12A and the motor 2B and the epicyclic reduction gear 12B are disposed symmetric laterally in the vehicle's width direction within the reduction gear case 11. As shown in FIG. 4, the reduction gear case 11 is supported by supporting portions 13a, 13b of a frame member 13 which makes up part of a frame which makes up, in turn, a framework of the vehicle 3 and a frame, not shown, of the rear-wheel drive system 1. The supporting portions 13a, 13b are provided left and right with respect to the center of the frame member 13 in the vehicle's width direction. Note that in FIG. 4, arrows denote a positional relationship when the rear-wheel drive system 1 is mounted in the vehicle.

Stators 14A, 14B of the motors 2A, 2B are fixed to insides of both left and right end portions of the reduction gear case 11, and annular rotors 15A, 15B are disposed rotatably on inner circumferential sides of the stators 14A, 14B. Cylindrical shafts 16A, 16B that surround outer circumferences of the axles 10A, 10B are connected to inner circumferential portions of the rotors 15A, 15B. These cylindrical shafts 16A, 16B are supported on end walls 17A, 17B and intermediate walls 18A, 18B of the reduction gear case 11 via bearings 19A, 19B so as to rotate relative to and concentric with the axles 10A, 10B. Resolvers 20A, 20B that feed information on rotational positions of the rotors 15A, 15B back to a controller (not shown) for controlling the motors 2A, 2B are provided on outer circumferences of one end portions of the cylindrical shafts 16A, 16B and on the end walls 17A, 17B of the reduction gear case 11.

The epicyclic reduction gears 12A, 12B include sun gears 21A, 21B, pluralities of planetary gears 22A, 22B that are caused to mesh with the sun gears 21, planetary carriers 23A, 23B that support these planetary gears 22A, 22B and ring gears 24A, 24B that are caused to mesh with outer circumferential sides of the planetary gears 22A, 22B. Driving forces from the motors 2A, 2B are inputted into the epicyclic reduction gears 12A, 12B from the sun gears 21A, 21B and the decelerated driving forces are outputted therefrom through the planetary carriers 23A, 23B.

Figure 3:
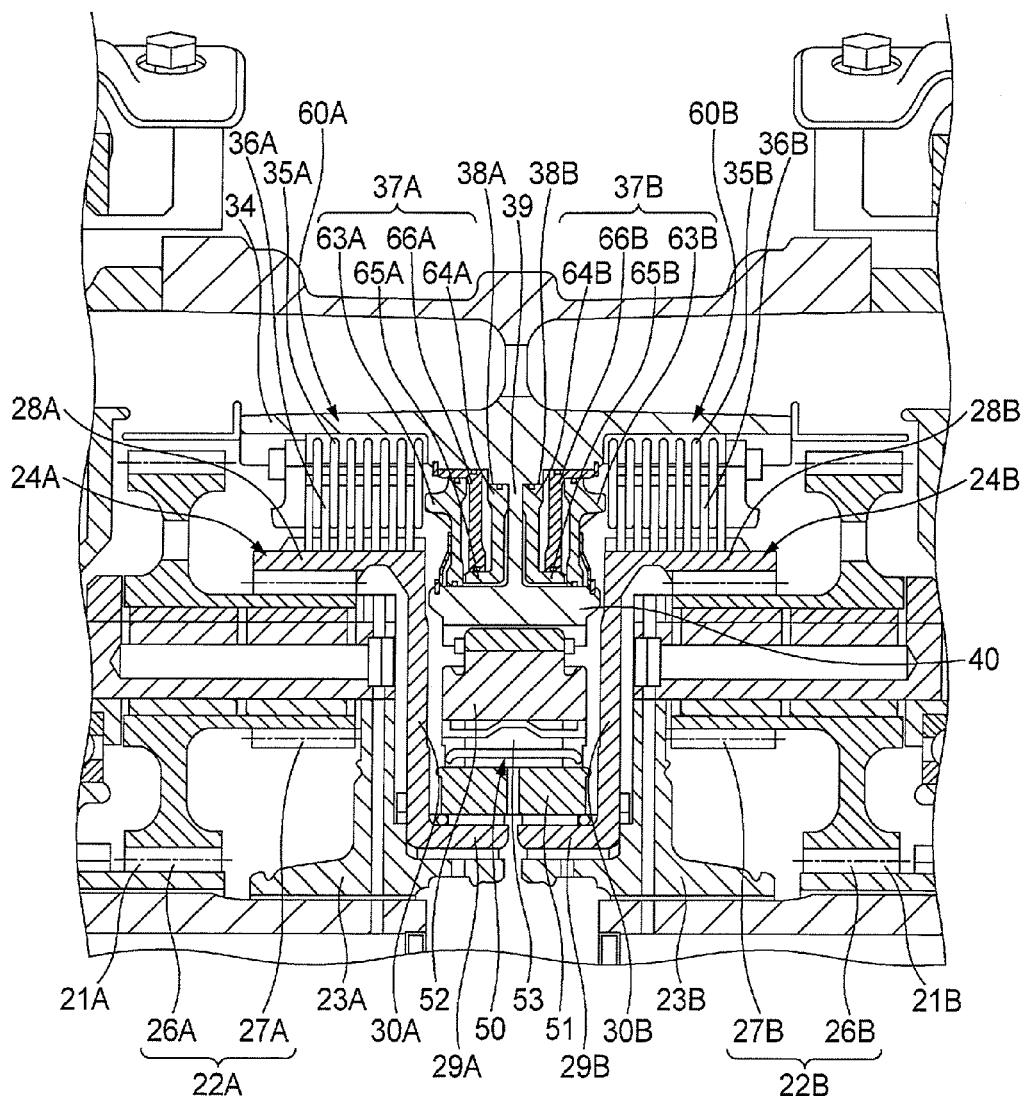
FIG. 3 is a partially enlarged view of the rear-wheel drive system shown in FIG. 2.

The sun gears 21A, 21B are formed integrally with the cylindrical shafts 16A, 16B. For example, as shown in FIG. 3, the planetary gears 22A, 22B are double pinions that have first pinions 26A, 26B that are larger in diameter and which are caused to mesh directly with the sun gears 21A, 21B and second pinions 27A, 27B that are smaller in diameter than the first pinions 26A, 26B, and the first pinions 26A, 26B and the second pinions 27A, 27B are formed integrally in such a manner that the first and second pinions are concentric and are offset in an axial direction. The planetary gears 22A, 22B are supported by the planetary carriers 23A, 23B. Axially inward end portions of the planetary carriers 23A, 23B extend radially inwards and spline fit on the axles 10A, 10B, whereby the planetary carriers 23A, 23B are supported on the axles 10A, 10B so as to rotate together therewith. The planetary carriers 23A, 23B are also supported on the intermediate walls 18A, 18B via bearings 33A, 33B.

The intermediate walls 18A, 18B divide motor accommodating spaces where the motors 2A, 2B are accommodated and reduction gear spaces where epicyclic reduction gears 12A, 12B are accommodated and are bent so that an axial space defined therebetween expands from a radially outward side to a radially inward side. Then, the bearings 33A, 33B that support the planetary carriers 23A, 23B are disposed on radially inward sides of the intermediate walls 18A, 18B and on sides thereof which face the epicyclic reduction gears 12A, 12B, and bus rings 41A, 41B for the stators 14A, 14B are disposed on radially outward sides of the intermediate walls 18A, 18B and sides thereof which face the motors 2A, 2B (refer to FIG. 2).

The ring gears 24A, 24B include gear portions 28A, 28B that mesh with the second pinions 27A, 27B which are smaller in diameter on inner circumferential surfaces, small diameter portions 29A, 29B that are smaller in diameter than the gear portions 28A, 28B and which are disposed so as to face oppositely each other in an intermediate position of the reduction gear case 11 and connecting portions 30A, 30B that connect axially inward end portions of the gear portions 28A, 28B with axially outward end portions of the small diameter portions 29A, 29B in a radial direction. In the case of this embodiment, maximum radii of the ring gears 24A, 24B are set so as to be smaller than maximum distances of the first pinions 26A, 26B from centers of the axles 10A, 10B. Both the small diameter portions 29A, 29B spline fit on an inner race 51 of one-way clutch 50, which will be described later, and the ring gears 24A, 24B rotates together with the inner race 51 of the one-way clutch 50.

Incidentally, a cylindrical space portion is secured between the reduction gear case 11 and the ring gears 24A, 24B. Then, hydraulic brakes 60A, 60B, which are configured as brake units for the ring gears 24A, 24B, are disposed in the space portion so as to overlap the first pinions 26A, 26B in the radial direction and overlap the second pinions 27A, 27B in the axial direction. In the hydraulic brakes 60A, 60B, pluralities of fixed plates 35A, 35B that spline fit on an inner circumferential surface of a cylindrical, radially outward support portion 34 that extends in the axial direction on a radially inward side of the reduction gear case 11 and pluralities of rotational plates 36A, 36B that spline fit on outer circumferential surfaces of the ring gears 24A, 24B are disposed alternately, and these plates 35A, 35B, 36A, 36B are operated to be engaged with and disengaged from each other by annular pistons 37A, 37B. The pistons 37A, 37B are accommodated in a reciprocating fashion in annular cylinder compartments 38A, 38B that are formed between a horizontally dividing wall 39 that extends radially inwards from the intermediate position of the reduction gear case 11 so as to divide horizontally the interior of the reduction gear case 11 into left and right portions and the radially outward support portion 34 and a radially inward support portion 40 which are connected with each other by the horizontally dividing wall 39. The pistons 37A, 37B are caused to advance by introducing highly pressurized oil into the cylinder compartments 38A, 38B, while the pistons 37A, 37B are withdrawn by discharging the oil from the cylinder compartments 38A, 38B. Note that the hydraulic brakes 60A, 60B are connected to an electric oil pump 70 that is disposed between the support portions 13a, 13b of the frame member 13 as shown in FIG. 4.

More specifically, the pistons 37A, 37B have first piston walls 63A, 63B and second piston walls 64A, 64B which are disposed forward and rearward of each other in the axial direction. These piston walls 63A, 63B, 64A, 64B are connected together by cylindrical inner circumferential walls 65A, 65B. Consequently, annular spaces that are opened radially outwards are formed between the first piston walls 63A, 63B and the second piston walls 64A, 64B, and these annular spaces are partitioned axially horizontally by partition members 66A, 66B that are fixed to inner circumferential surfaces of outer walls of the cylinder compartments 38A, 38B. Spaces defined between the horizontally dividing wall 39 of the reduction gear case 11 and the second piston walls 64A, 64B are configured as first hydraulic chambers 51 into which highly pressurized oil is introduced directly (refer to FIG. 5), and spaces defined between the partition members 66A, 66B and the first piston walls 63A, 63B are configured as second hydraulic chambers S2 that communicate with the first hydraulic chambers 51 by way of through holes formed in the inner circumferential walls 65A, 65B (refer to FIG. 5). Spaces defined between the second piston walls 64A, 64B and the partition members 66A, 66B communicate with the atmospheric pressure.

In these hydraulic brakes 60A, 60B, oil is introduced into the first hydraulic chambers 51 and the second hydraulic chambers S2 from a hydraulic circuit 71, which will be described later, and the fixed plates 35A, 35B and the rotational plates 36A, 36B can be pressed against each other by virtue of the pressure of the oil that acts on the first piston walls 63A, 63B and the second piston walls 64A, 64B. Consequently, a large pressure bearing surface area can be obtained by the first and second piston walls 63A, 63B, 64A, 64B that are disposed forwards and rearwards of each other in the axial direction. Therefore, it is possible to obtain a large pressing force to be applied to the fixed plates 35A, 35B and the rotational plates 36A, 36B while suppressing an increase in radial surface area of the pistons 37A, 37B.

In the case of the hydraulic brakes 60A, 60B, the fixed plates 35A, 35B are supported on the radially outward support portion 34 that extends from the reduction gear case 11, while the rotational plates 36A, 36B are supported on the ring gears 24A, 24B. Therefore, when both the plates 35A, 35B, 36A, 36B are pressed against each other by the pistons 37A, 37B, a braking force is applied to the ring gears 24A, 24B to fix them in place by virtue of frictional engagement of both the plates 35A, 35B and 36A, 36B. Then, when the engagement of the plates implemented by the pistons 37A, 37B is released, the ring gears 24A, 24B are permitted to rotate freely.

A space portion is secured between the connecting portions 30A, 30B of the ring gears 24A, 24B that face oppositely each other in the axial direction, and the one-way clutch 50 is disposed in the space portion, the one-way clutch 50 being adapted to transmit only power acting in one direction on the ring gears 24A, 24B and to cut off power acting in the other direction. The one-way clutch 50 is such that a number of sprags 53 are interposed between the inner race 51 and an outer race 52, and the inner race 51 spline fits on the small diameter portions 29A, 29B of the ring gears 24A, 24B so as to rotate together therewith. The outer race 52 is positioned and is restricted from rotation by the radially inward support portion 40. The one-way clutch 50 is brought into engagement when the vehicle 3 travels forwards based on the power of the motors 2A, 2B so as to lock the rotation of the ring gears 24A, 24B. To describe this more specifically, the one-way clutch 50 is put in an engaged state when rotational power in a forward direction (a rotational direction when the vehicle 3 travels forwards) at the motors 2A, 2B is inputted to the wheels Wr, while the one-way clutch 50 is put in a disengaged state when backward rotational power at the motors 2A, 2B is inputted into the wheels Wr. The one-way clutch 50 is put in the disengaged state when forward rotational power at the wheels Wr is inputted into the motors 2A, 2B, while the one-way clutch 50 is put in the engaged state when backward rotational force at the wheels Wr is inputted into the motors 2A, 2B.

In this way, in the rear-wheel drive system 1 of this embodiment, the one-way clutch 50 and the hydraulic brakes 60A, 60B are provided in parallel on a power transmission line between the motors 2A, 2B and the wheels Wr.

Next, referring to FIGS. 5 to 8, the hydraulic circuit that makes up a hydraulic pressure control unit of the rear-wheel drive system 1 will be described.

The hydraulic circuit 71 can supply oil that is taken into the electric oil pump 70 from an inlet port 70a disposed in an oil pan 80 (a first oil reservoir portion) and which is discharged from the electric oil pump 70 to the first hydraulic chambers 51 of the hydraulic brakes 60A, 60B via a low-pressure oil path selector valve 73 and a brake oil path selector valve 74 and also can supply the oil to a lubricating and cooling portion 91 for the motors 2A, 2B and the epicyclic reduction gears 12A, 12B via the low-pressure oil path selector valve 73. The electric oil pump 70 can be driven (operated) in at least two modes of a high-pressure mode and a low-pressure mode by a motor 90 which is made up of a position sensor-less and brushless direct current motor and is controlled through a PID control. Reference numeral 92 denotes a pressure sensor for detecting an oil pressure in a brake oil path 77. A temperature sensor (not shown) is also provided in the hydraulic circuit 71.

The low-pressure oil path selector vale 73 is connected to a first line oil path 75a of a line oil path 75 that is disposed on a side that faces the electric oil pump 70, a second line oil path 75b of the line oil path 75 that is disposed on a side that faces the brake oil path selector valve 74, a first low-pressure oil path 76a that communicates with the lubricating and cooling portion 91 and a second low-pressure oil path 76b that communicates with the lubricating and cooling portion 91. The low-pressure oil path selector valve 73 includes a valve element 73a that establishes a normal communication between the first line oil path 75a and the second line oil path 75b and which causes the line oil path 75 to communicate selectively with the first low-pressure oil path 76a or the second low-pressure oil path 76b, a spring 73b that biases the valve element 73a in a direction (rightwards in FIG. 5) in which the line oil path 75 and the first low-pressure oil path 76a are caused to communicate with each other, and an oil chamber 73c that pushes the valve element 73a by virtue of an oil pressure in the line oil path 75 in a direction (leftwards in FIG. 5) in which the line oil path 75 and the second low-pressure oil path 76b are caused to communicate with each other. Consequently, the valve element 73a is biased by the spring 73b in the direction (rightwards in FIG. 5) in which the line oil path 75 and the first low-pressure oil path 76a are caused to communicate with each other and is pushed by the oil pressure in the line oil path 75 that is inputted into the oil chamber 73c at a right end of the low-pressure oil path selector valve 73 as seen in the figure in the direction (leftwards in FIG. 5) in which the line oil path 75 and the second low-pressure oil path 76b are caused to communicate with each other.

Figure 6A:
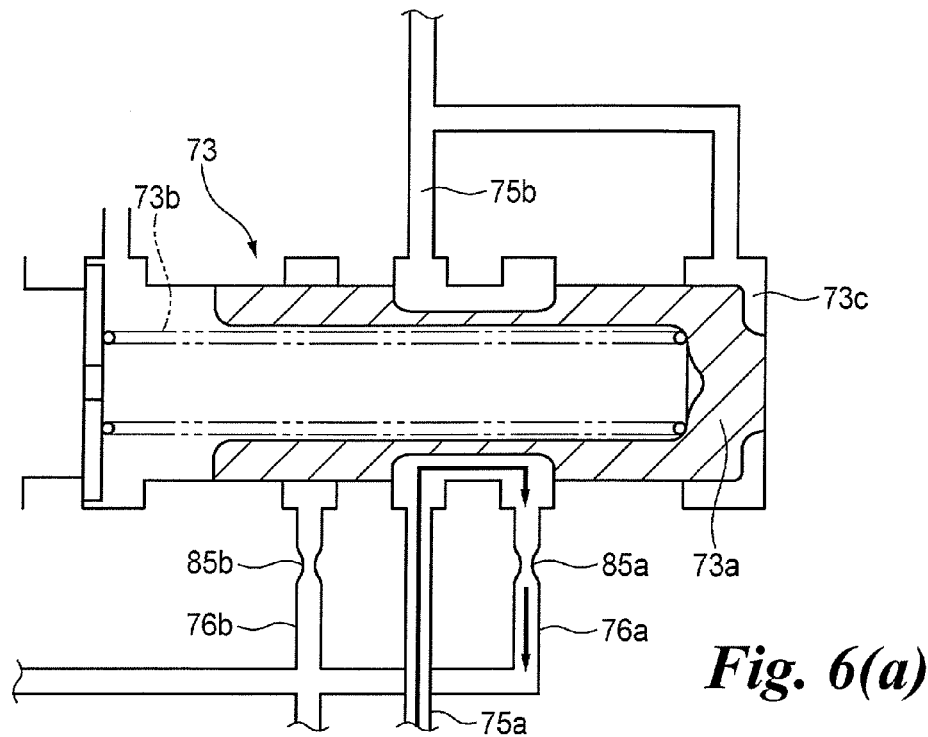
FIG. 6($a$) is an explanatory diagram when a low-pressure oil path selector valve is positioned in a low-pressure side position, and FIG. 6($b$) is an explanatory diagram when the low-pressure oil path selector valve is positioned in a high-pressure side position.
Figure 6B:
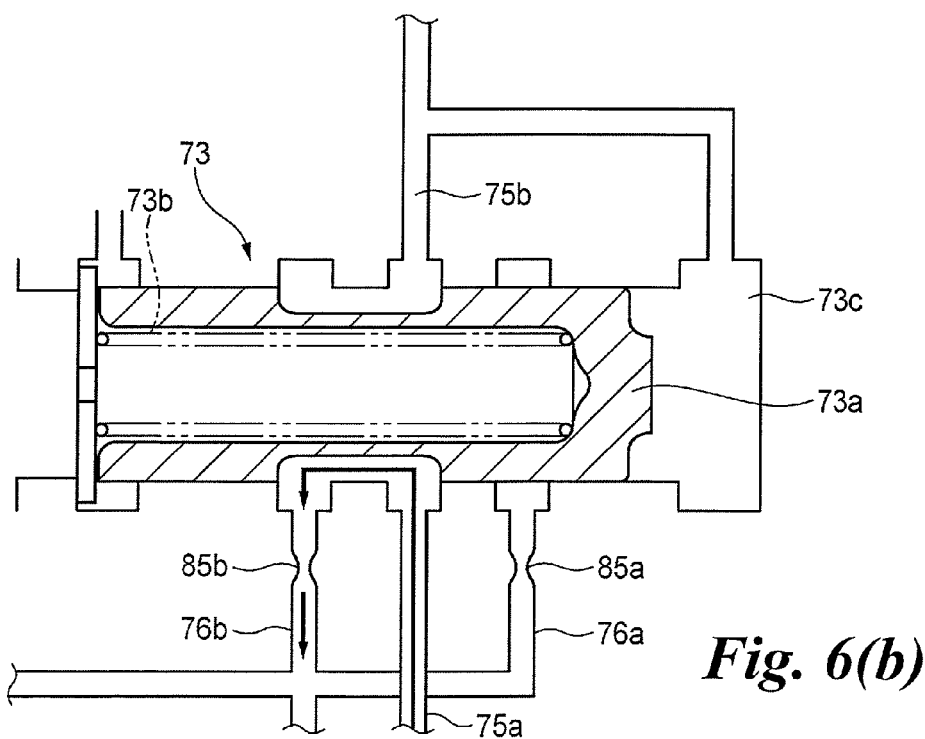

The biasing force of the spring 73b is set so that under an oil pressure in the line oil path 75 that is inputted into the oil chamber 73 while the electric oil pump 70 is operating in the low-pressure mode, which will be described later, as shown in FIG. 6(a), the valve element 73a stays stationary, and the line oil path 75 is cut off from the second low-pressure oil path 76b and is then caused to communicate with the first low-pressure oil path 76a (hereinafter, the position of the valve element 73a shown in FIG. 6(a) will be referred to as a low-pressure side position). Under an oil pressure in the line oil path 75 that is inputted into the oil chamber 73c while the electric oil pump 70 is operating in the high-pressure mode, which will be described later, as shown in FIG. 6(b), the valve element 73a moves and the line oil path 75 is cut off from the first low-pressure oil path 76a and is then caused to communicate with the second low-pressure oil path 76b (hereinafter, the position of the valve element 73a shown in FIG. 6(b) will be referred to as a high-pressure side position).

The brake oil path selector valve 74 is connected to the second line oil path 75b that makes up the line oil path 75, the brake oil path 77 that is connected to the hydraulic brakes 60A, 60B, and a reservoir portion 79 (a second oil reservoir portion) via a high-positioned drain 78. The brake oil path selector valve 74 includes a valve element 74a that establishes and cuts off a communication between the second line oil path 75b and the brake oil path 77, a spring 74b that biases the valve element 74a in a direction (rightwards in FIG. 5) in which a communication between the second line oil path 75b and the brake oil path 77 is cut off, and an oil chamber 74c that pushes the valve element 74a by virtue of an oil pressure in the line oil path 75 in a direction (leftwards in FIG. 5) in which the second line oil path 75b and the brake oil path 77 are caused to communicate with each other. Consequently, the valve element 74a is biased by the spring 74b in the direction (rightwards in FIG. 5) in which the communication between the second line oil path 75b and the brake oil path 77 is cut off and can be pushed by virtue of the oil pressure in the line oil path 75 that is inputted into the oil chamber 74c in the direction (leftwards in FIG. 5) in which the second line oil path 75b and the brake oil path 77 are caused to communicate with each other.

Figure 7A:
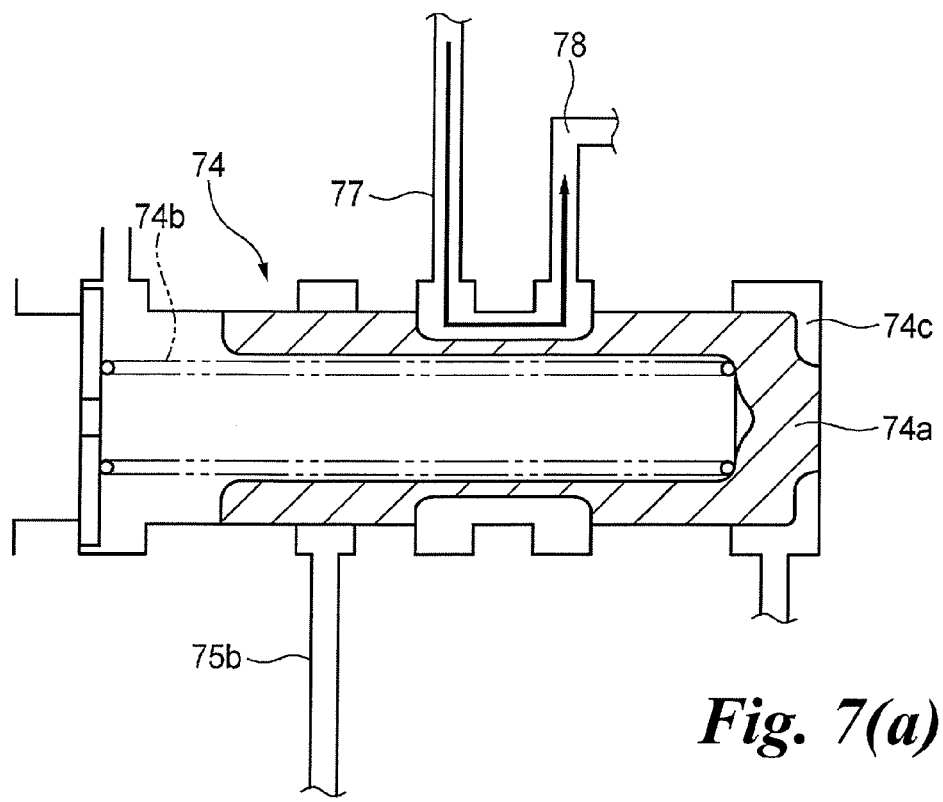
FIG. 7($a$) is an explanatory diagram when a brake oil path selector valve is positioned in a valve closing position, and FIG. 7($b$) is an explanatory diagram when the brake oil path selector valve is positioned in a valve opening position.
Figure 7B:
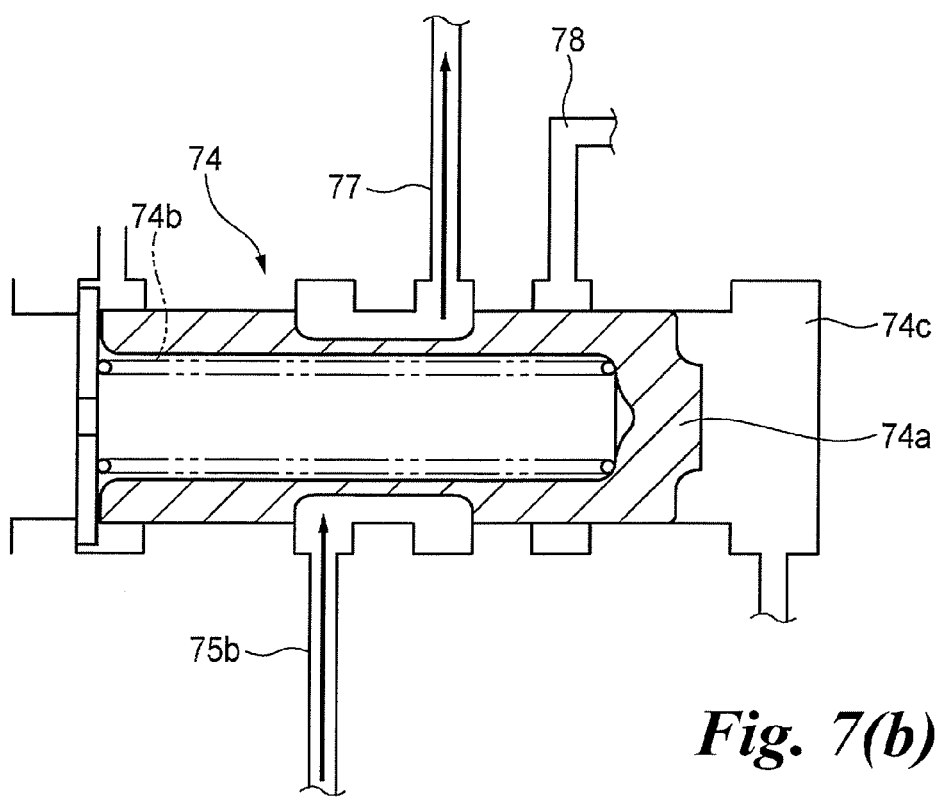

The biasing force of the spring 74b is set so that the valve element 74a is shifted from a valve closing position shown in FIG. 7(a) to a valve opening position shown in FIG. 7(b) by virtue of the oil pressure in the line oil path 75 that is inputted into the oil chamber 74c while the electric pump 70 is operating in the low-pressure mode and the high-pressure mode, so that the brake oil path 77 is cut off from the high-positioned drain 78 and is then caused to communicate with the second line oil path 75b. Namely, the oil pressure of the line oil path 75 that is inputted into the oil chamber 74c exceeds the biasing force of the spring 74c even when the electric oil pump 70 is caused to operate either in the low-pressure mode or in the high-pressure mode, whereby the brake oil path 77 is cut off from the high-positioned drain 78 and is then caused to communicate with the second line oil path 75b.

With the second line oil path 75b cut off from the brake oil path 77, the hydraulic brakes 60A, 60B are caused to communicate with the reservoir portion 79 via the brake oil path 77 and the high-positioned drain 78. The reservoir portion 79 is disposed in a higher position than the oil pan 80 in a vertical direction. More preferably, the reservoir portion 79 is disposed so that a vertically highest portion of the reservoir portion 79 becomes vertically higher than a middle point between vertically highest portions and vertically lowest portions of the first hydraulic chambers 51 of the hydraulic brakes 60A, 60B. Consequently, with the brake oil path selector valve 74 closed, oil reserved in the first hydraulic chambers 51 of the hydraulic brakes 60A, 60B is not discharged directly into the oil pan 80 but is discharged into the reservoir portion 79 for storage. Note that oil that overflows from the reservoir portion 79 is discharged into the oil pan 80. A reservoir portion side end portion 78a of the high-positioned drain 78 is connected to a bottom surface of the reservoir portion 79.

The coil chamber 74c of the brake oil path selector valve 74 can be connected to the second line oil path 75b that makes up the line oil path 75 via a pilot oil path 81 and a solenoid valve 83. The solenoid valve 83 is made up of an electromagnetic three-way valve that is controlled by the ECU 45, and when the ECU 45 causes a solenoid 174 (refer to FIG. 8) of the solenoid valve 83 to be de-energized, the second line oil path 75b is connected to the pilot oil path 81, so that the oil pressure in the line oil path 75 is inputted into the oil chamber 74c.

As shown in FIG. 8, the solenoid valve 83 includes a three-way valve member 172, the solenoid 174 that is provided in a case member 173 and which receives electric power that is supplied by way of a cable, not shown, to thereby be excited, a solenoid valve element 175 that receives excitation force of the solenoid 174 to thereby be drawn rightwards, a solenoid spring 176 that is accommodated in a spring holding recessed portion 173a that is formed in the center of the case member 173 so as to bias the solenoid valve element 175 leftwards, and a guide member 177 that is provided within the three-way valve member 172 so as to guide the solenoid valve element 175 in a reciprocating motion in a slidable fashion.

The three-way valve member 172 is a substantially bottomed cylindrical member and has a right recessed hole 181 that is formed along a center line thereof from a right end portion substantially to a middle portion, a left recessed hole 182 that is formed similarly along the center line from a left end portion to the proximity of the right recessed hole 181, a first radial hole 183 that is formed between the right recessed hole 181 and the left recessed hole 182 along a direction that is at right angles to the center line, a second radial hole 184 that communicates with a substantially middle portion of the right recessed hole 181 and which is formed along the direction that is at right angles to the center line, a first axial hole 185 that is formed along the center line and which establishes a communication between the left recessed hole 182 and the first radial hole 183, and a second axial hole 186 that is formed along the center line and which establishes a communication between the first radial hole 183 and the right recessed hole 181.

A ball 187 is placed at a bottom portion of the left recessed hole 182 of the three-way valve member 172 so that the ball 187 can move leftward and rightward directions so as to open and close the first axial hole 185, and a cap 188 which restricts the displacement of the ball 187 from the left recessed hole 182 is fitted at an entrance side of the left recessed hole 182. A through hole 188a which communicates with the first axial hole 185 is formed in the cap 188 along the center line.

The second axial hole 186 is opened or closed when a root portion of an opening and closing projection 175a that is formed at a left end portion of the solenoid valve element 175 that reciprocates horizontally moves away from the same hole or comes in contact with the hole. The ball 187 that opens and closes the first axial hole 185 is moved leftwards and rightwards at a distal end portion of the opening and closing projection 175a of the solenoid valve element 175 that moves leftwards and rightwards.

Figure 8A:
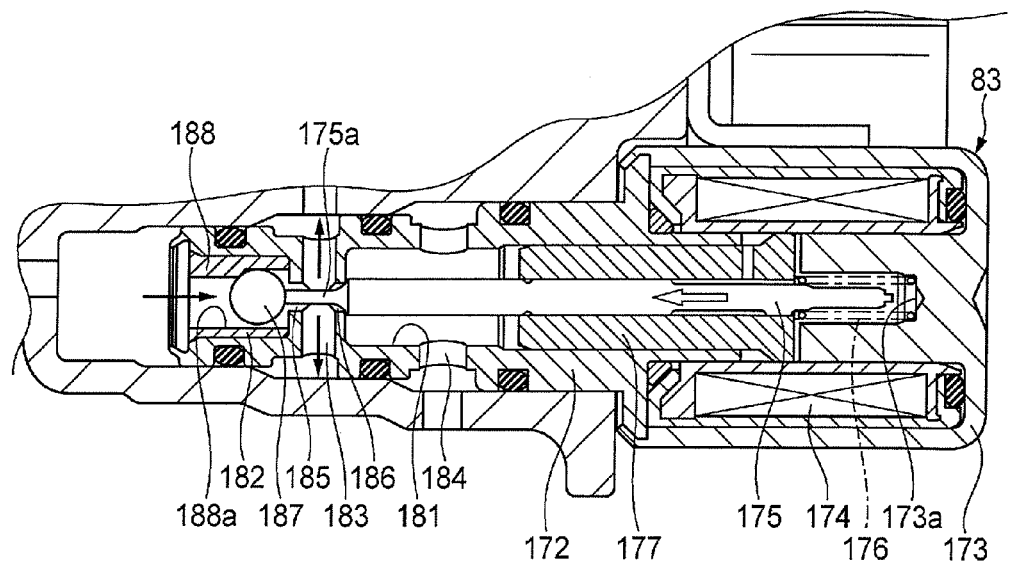
FIG. 8($a$) is an explanatory diagram when a solenoid valve is de-energized, and FIG. 8($b$) is an explanatory diagram when the solenoid valve is energized.

Then, in the solenoid valve 83, by de-energizing the solenoid 174 (stopping the supply of electric power thereto), as shown in FIG. 8(a), receiving the biasing force of the solenoid valve 176, the solenoid valve element 175 moves leftwards, and the distal end portion of the opening and closing projection 175a of the solenoid valve element 175 pushes the ball 187, whereby the first axial hole 185 is opened, while the second axial hole 186 is closed when the root portion of the opening and closing projection 175a of the solenoid valve element 175 comes into contact with the second axial hole 186. By adopting this configuration, the second line oil path 75b that makes up the line oil path 75 communicates with the oil chamber 74c from the first axial hole 185 and the first radial hole 183 via the pilot oil path 81 (hereinafter, the position of the solenoid valve element 175 shown in FIG. 8(a) will from time to time be referred to as a valve opening position).

Figure 8B:
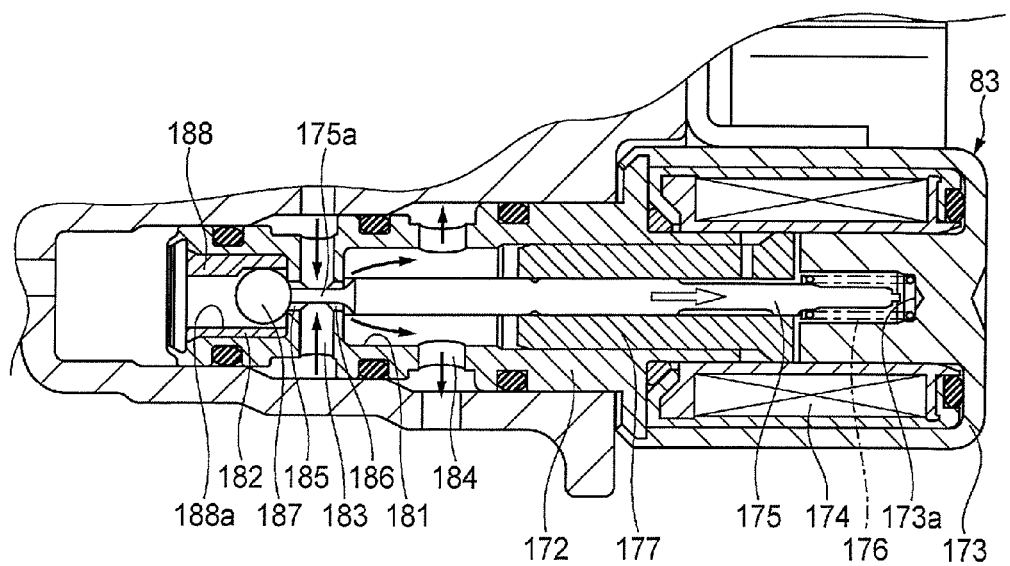

By energizing the solenoid 174 (supplying electric power thereto), as shown in FIG. 8(b), receiving the excitation force of the solenoid 174, the solenoid valve element 175 moves rightwards against the biasing force of the solenoid spring 176, and the oil pressure from the through hole 188a pushes the ball 187, whereby the first axial hole 185 is closed, and the root portion of the opening and closing projection 175a of the solenoid valve element 175 moves away from the second axial hole 186, the second axial hole 186 being thereby opened. By the second axial hole 186 being so opened, oil reserved in the oil chamber 74c is discharged into the oil pan 80 via the first radial hole 183, the second axial hole 186 and the second radial hole 184, and the second line oil path 75b and the pilot oil path 81 are cut off (hereinafter, the position of the solenoid valve element 175 shown in FIG. 8(b) will from time to time be referred to as a valve closing position).

Returning to FIG. 5, in the hydraulic circuit 71, the first low-pressure oil path 76a and the second low-pressure oil path 76b merge with each other at their downstream sides into a low-pressure common oil path 76c which is common to both the oil paths. A relief valve 84 is connected to a merging portion, and when a line pressure in the low-pressure common oil path 76c reaches or exceeds a predetermined pressure, this relief valve 84 allows oil within the low-pressure common oil path 76c to be discharged into the oil pan 80 via a relief drain 86 to thereby reduce the oil pressure.

As shown in FIG. 6, the first low-pressure oil path 76a and the second low-pressure oil path 76b have orifices 85a, 85b which are formed therein as flow path resistance structures, and the orifice 85a in the first low-pressure oil path 76a is made larger in diameter than the orifice 85b in the second low-pressure oil path 76b. Consequently, a flow path resistance in the second low-pressure oil path 76b is larger than a flow path resistance in the first low-pressure oil path 76a, whereby a pressure reduction amount in the second low-pressure oil path 76b while the electric oil pump 70 is operating in the high-pressure mode becomes larger than a pressure reduction amount in the first low-pressure oil path 76a while the electric oil pump 70 is operating in the low-pressure mode, the oil pressure in the low-pressure common oil path 76c being thereby substantially equal when in the high-pressure mode and the low-pressure mode.

In the low-pressure oil path selector valve 73 that is connected to the first low-pressure oil path 76a and the second low-pressure oil path 76b in the way described above, with the electric oil pump 70 operating in the low-pressure mode, the biasing force of the spring 73b is superior in magnitude to the oil pressure in the oil chamber 73c, and the valve element 73a is positioned in the low-pressure side position by the biasing force of the spring 73b, whereby the line oil path 75 is cut off from the second low-pressure oil path 76b and is then caused to communicate with the first low-pressure oil path 76a. Oil flowing in the first low-pressure oil path 76a reaches the lubricating and cooling portion 91 via the low-pressure common oil path 76c while being subjected to the flow path resistance at the orifice 85a to thereby be reduced in pressure. On the other hand, while the electric oil pump 70 is operating in the high-pressure mode, the oil pressure within the oil chamber 73c is superior in magnitude to the biasing force of the spring 73b, and the valve element 73a is positioned in the high-pressure side position against the biasing force of the spring 73b, whereby the line oil path 75 is cut off from the first low-pressure oil path 76a and is then caused to communicate with the second low-pressure oil path 76b. Oil flowing in the second low-pressure oil path 76b reaches the lubricating and cooling portion 91 via the low-pressure common oil path 76c while being subjected to the flow path resistance that is larger than the flow path resistance at the orifice 85a at the orifice 85b to thereby be reduced in pressure.

Consequently, when the electric oil pump 70 is switched from the low-pressure mode to the high-pressure mode, the oil flow path is automatically switched from the oil path having the smaller flow path resistance to the oil path having the larger flow path resistance according to a change in oil pressure in the line oil path 75. Therefore, an excessive oil supply to the lubricating and cooling portion 91 is suppressed when in the high-pressure mode.

A plurality of orifices 85c are provided as other flow path resistance structures in oil paths that reach the lubricating and cooling portion 91 from the low-pressure common oil path 76c. The plurality of orifices 85c are set so that a minimum flow path sectional area of the orifice 85a in the first low-pressure oil path 76a is smaller than a minimum flow path sectional area of the plurality of orifices 85c. Namely, the flow path resistance of the orifice 85a of the first low-pressure oil path 76a is set larger than a flow path resistance of the plurality of orifices 85c. In this case, the minimum flow path sectional area of the plurality of orifices 85c is a total sum of minimum flow path sectional areas of the respective orifices 85c. By adopting this configuration, it is possible to cause the oil to flow at a desired flow rate by adjusting the orifice 85a in the first low-pressure oil path 76a and the orifice 85b in the second low-pressure oil path 76b.

The ECU 45 (refer to FIG. 1) is a control unit for performing various controls in the whole vehicle. Vehicle speed, steering angle, accelerator pedal opening AP, gear position and SOC are inputted into the ECU 45, while outputted from the ECU 45 are a signal that controls the internal combustion engine 4, a signal that controls the motors 2A, 2B, signals indicating a generating state, charging state and discharging state of the battery 9, a control signal to be inputted into the solenoid 174 of the solenoid valve 83 and a control signal that controls the electric oil pump 70.

Namely, the ECU 45 includes at least a function as a motor controller for controlling the motors 2A, 2B and a function as a connection/disconnection unit controller for controlling the hydraulic brakes 60A, 60B as the connection/disconnection unit. When functioning as the connection/disconnection unit controller, the ECU 45 controls the electric oil pump 70 and the solenoid 174 of the solenoid valve 83 based on the driven state of the motors 2A, 2B and/or a driving command (a driving signal) given to the motors 2A, 2B. The electric oil pump 70 may be controlled based on a revolution speed control or a torque control, and the electric oil pump 70 is controlled based on target oil pressures in the first hydraulic chambers 51 and the second hydraulic chambers S2. The electric oil pump 70 is preferably controlled based on actual oil pressures that are detected from the pressure sensor 92 and target oil pressures of the first hydraulic chambers 51 and the second hydraulic chambers S2. Note that in place of the actual oil pressures that are given from the pressure sensor 92, estimated oil pressures obtained by an oil pressure estimation unit may be used.

Next, the operation of the hydraulic circuit 71 of the rear-wheel drive system 1 will be described.

Figure 5:
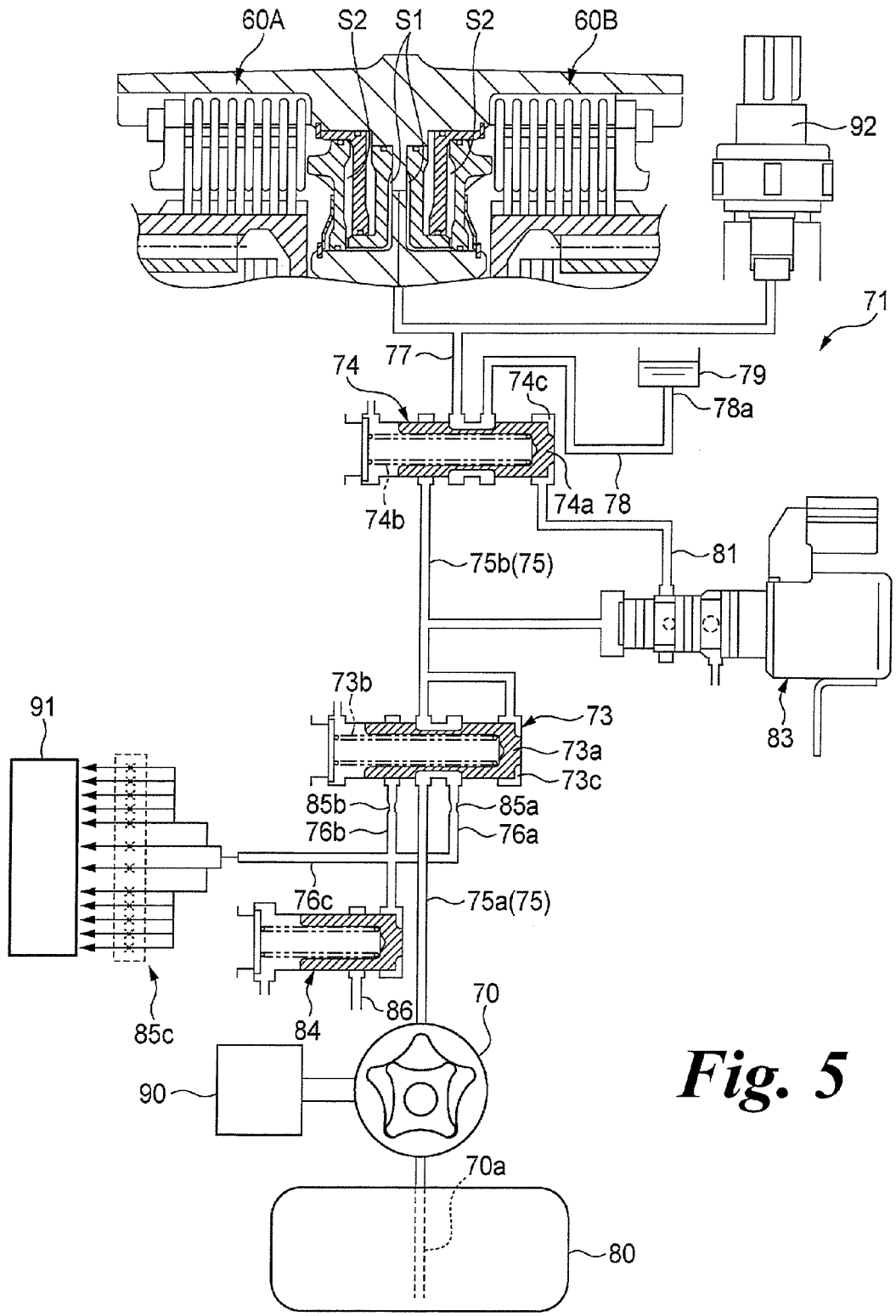
FIG. 5 is a hydraulic circuit diagram of a hydraulic pressure control unit that controls hydraulic brakes.

FIG. 5 shows the hydraulic circuit 71 with the hydraulic brakes 60A, 60B kept released while the vehicle is stopped. In this state, the ECU 45 does not operate the electric oil pump 70. By so doing, the valve element 73a of the low-pressure oil path selector valve 73 is positioned in the low-pressure side position, and the valve element 74a of the brake oil path selector valve 74 is positioned in the valve closing position, no oil pressure being thereby supplied to the hydraulic circuit 71.

Figure 9:
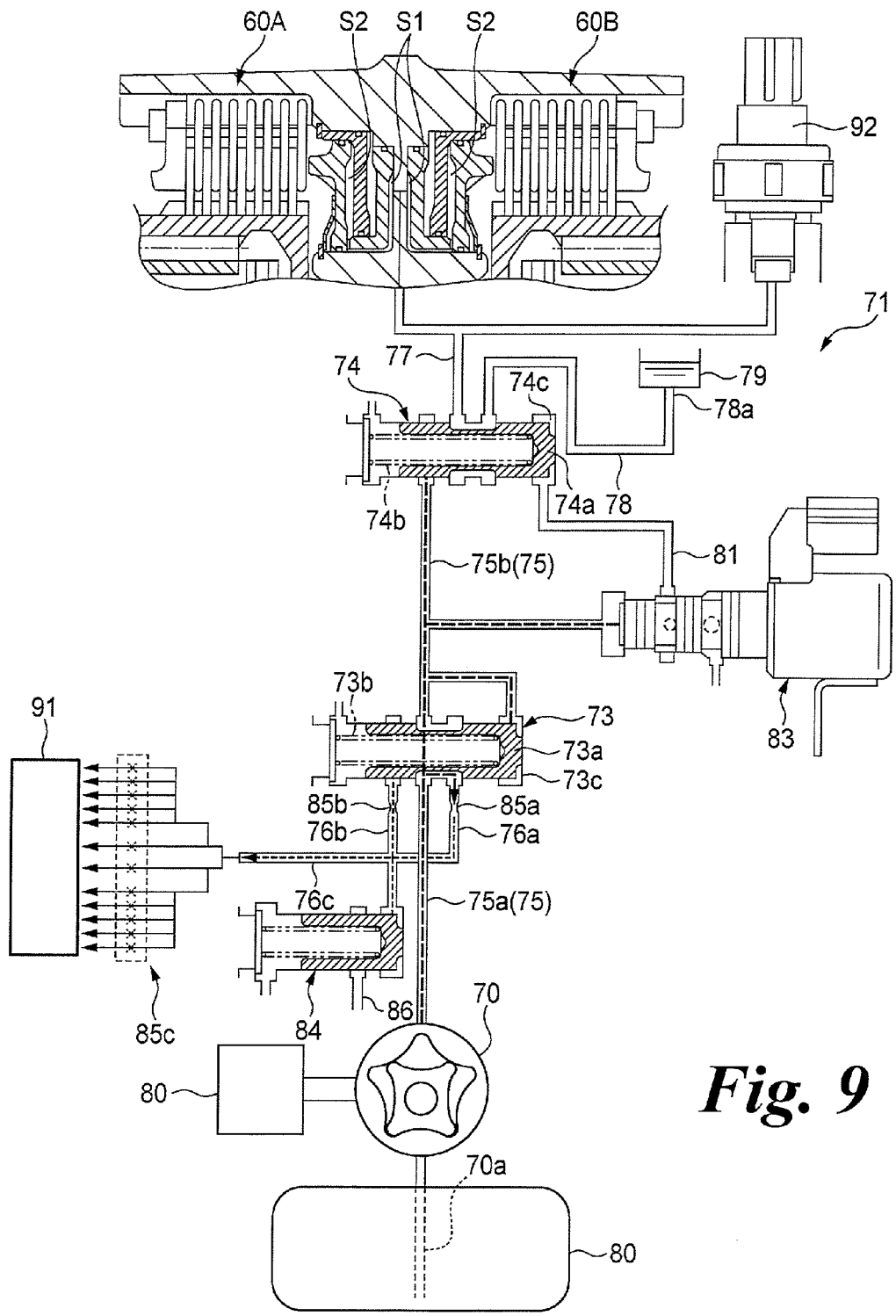
FIG. 9 is a hydraulic circuit diagram of the hydraulic pressure control unit when the hydraulic brakes are in a released state while the vehicle is being driven.

FIG. 9 shows a state in which the hydraulic brakes 60A, 60B are released while the vehicle is being driven. In this state, the ECU 45 operates the electric oil pump 70 in the low-pressure mode. Additionally, the ECU 45 energizes the solenoid 174 of the solenoid valve 83, whereby the second line oil path 75b and the pilot oil path 81 are cut off. By so doing, the valve element 74a of the brake oil path selector valve 74 is positioned in the valve closing position by the biasing force of the spring 74b, whereby the communication between the second line oil path 75b and the brake oil path 77 is cut off, while the brake oil path 77 is caused to communicate with the high-positioned drain 78, the hydraulic brakes 60A, 60B being thereby released. Thus, the brake oil path 77 is connected to the reservoir portion 79 via the high-positioned drain 78.

In the low-pressure oil path selector valve 73, the biasing force of the spring 73b is larger than an oil pressure that is produced in the line oil path 75 while the electric oil pump 70 is operating in the low-pressure mode and which is inputted into the oil chamber 73c disposed at the right end of the selector valve 73 as shown in the figure. Therefore, the valve element 73a is positioned in the low-pressure side position, whereby the communication of the line oil path 75 with the second low-pressure oil path 76b is cut off, and the line oil path 75 is caused to communicate with the first low-pressure oil path 76a. By so doing, oil in the line oil path 75 is supplied to the lubricating and cooling portion 91 via the first low-pressure oil path 76a while being reduced in pressure at the orifice 85a.

Figure 10:
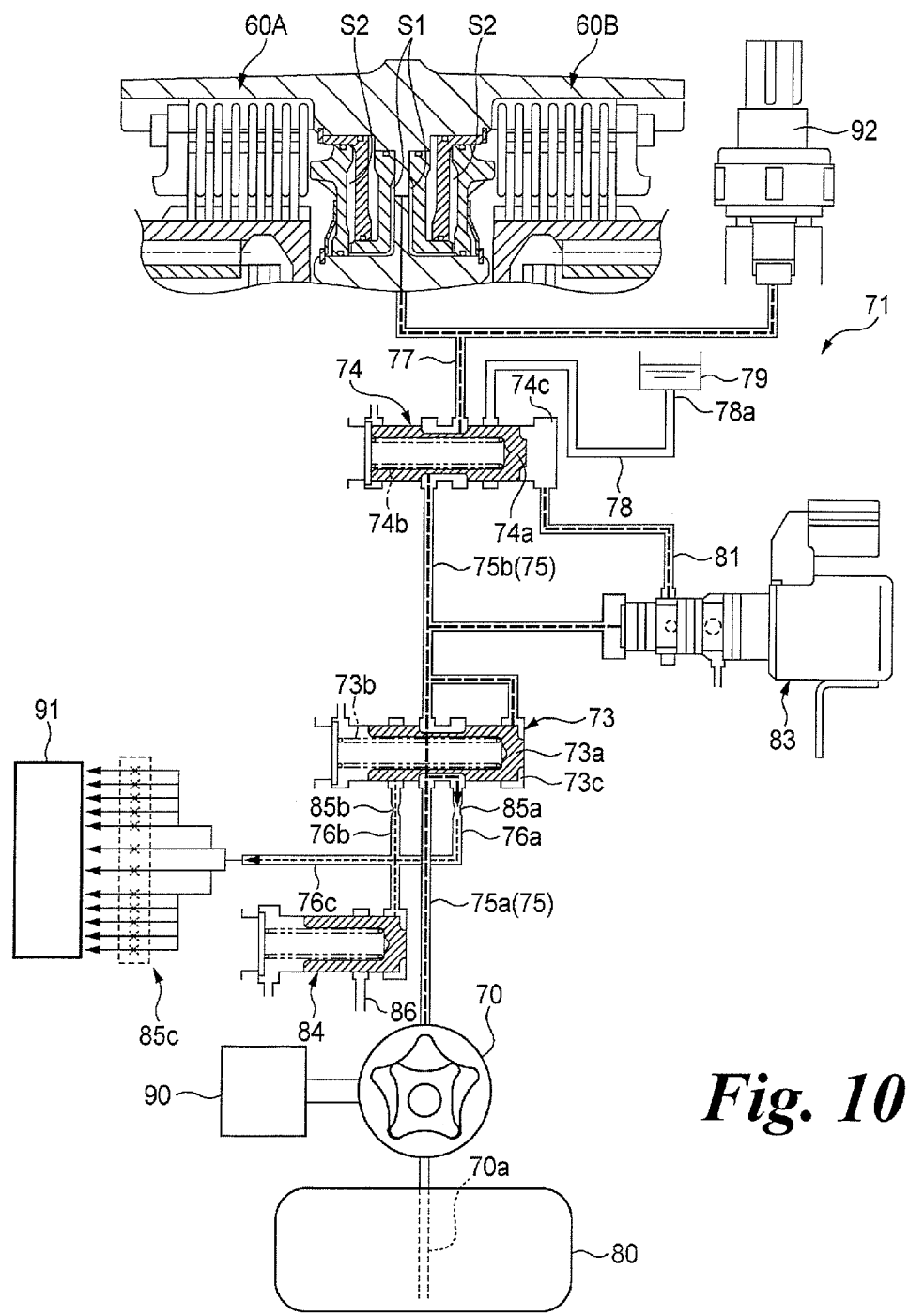
FIG. 10 is a hydraulic circuit diagram of the hydraulic pressure control unit when the hydraulic brakes are in a weak applied state.

FIG. 10 shows the hydraulic circuit 71 with the hydraulic brakes 60A, 60B applied weakly. The weak application means a state in which the hydraulic brakes 60A, 60B are applied with an application force that is weaker than an application force with which the hydraulic brakes 60A, 60B are applied properly although the power transmission is enabled. As this occurs, the ECU 45 operates the electric oil pump 70 in the low-pressure mode. Additionally, the ECU 45 de-energizes the solenoid 174 of the solenoid valve 83 and causes the oil pressure in the second line oil path 75b to be inputted into the oil chamber 74c of the brake oil path selector valve 74. By so doing, the oil pressure within the oil chamber 74c becomes superior in magnitude to the biasing force of the spring 74b, whereby the valve element 74a is positioned in the valve opening position, and the communication between the brake oil path 77 and the high-positioned drain 78 is cut off, while the brake oil path 77 is caused to communicate with the second oil line 75b, the hydraulic brakes 60A, 60B being thereby applied weakly.

As this occurs, too, as with when the hydraulic brakes 60A, 60B are released, in the low-pressure oil path selector valve 73, the biasing force of the spring 73b is larger than the oil pressure in the line oil path 75 that is produced while the electric oil pump 70 is operating in the low-pressure mode and which is inputted into the oil chamber 73c disposed at the right end of the selector valve 73 as seen in the figure. Therefore, the valve element 73a is positioned in the low-pressure side position, and the communication of the line oil path 75 with the second low-pressure oil path 76b is cut off, while the line oil path 75 is caused to communicate with the first low-pressure oil path 76a. By so doing, the oil in the line oil path 75 is supplied to the lubricating and cooling portion 91 via the first low-pressure oil path 76a while being reduced in pressure at the orifice 85a.

Figure 11:
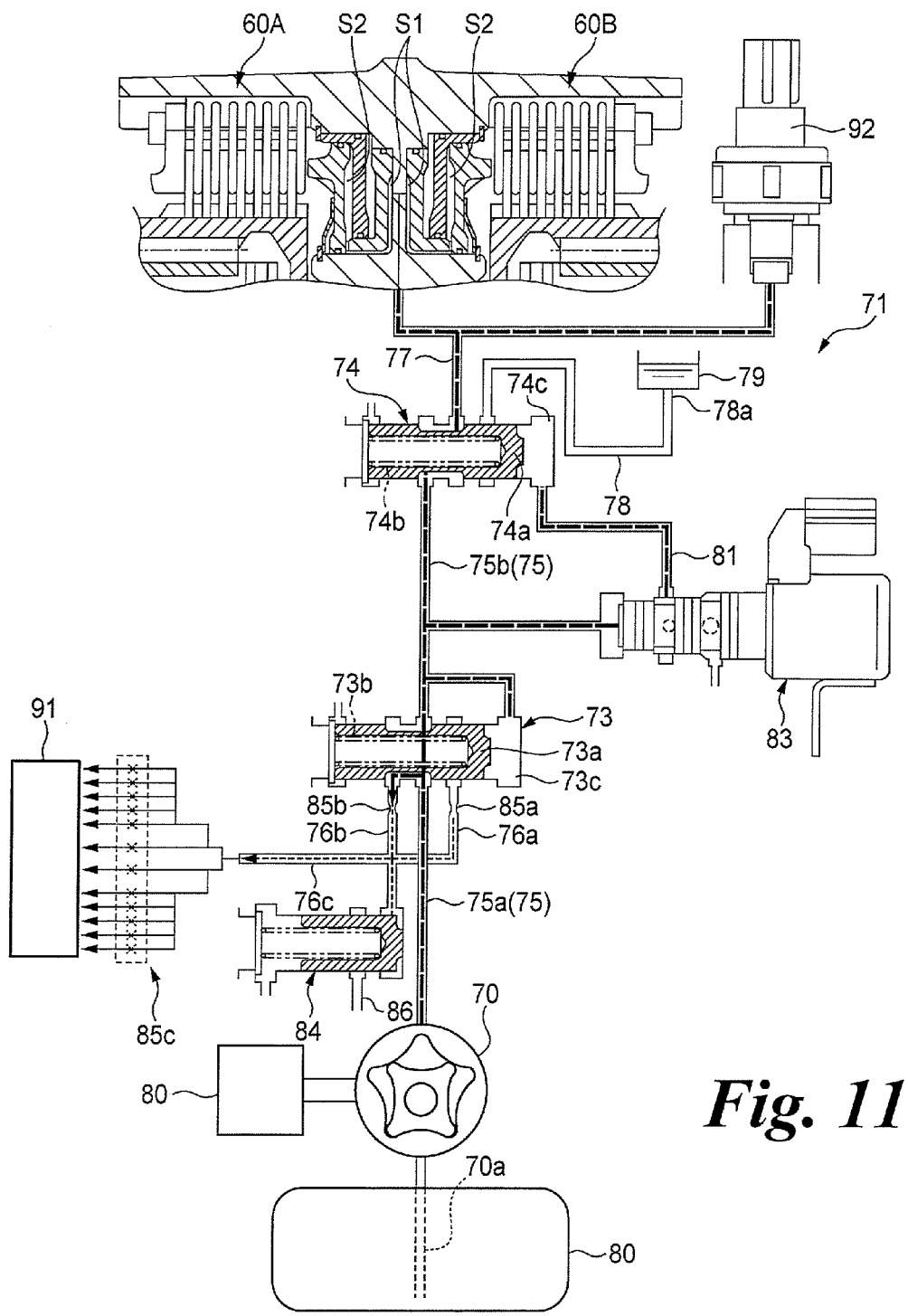
FIG. 11 is a hydraulic circuit diagram of the hydraulic pressure control unit when the hydraulic brakes are in an applied state.

FIG. 11 shows the hydraulic circuit 71 with the hydraulic brakes 60A, 60B applied. As this occurs, the ECU 45 operates the electric oil pump 70 in the high-pressure mode. Additionally, the ECU 45 de-energizes the solenoid 174 of the solenoid valve 83 and causes the oil pressure in the second line oil path 75b to be inputted into the oil chamber 74c disposed at the right end of the brake oil path selector valve 74. By so doing, the oil pressure within the oil chamber 74c becomes superior in magnitude to the biasing force of the spring 74b, whereby the valve element 74a is positioned in the valve opening position, and the communication between the brake oil path 77 and the high-positioned drain 78 is cut off, while the brake oil path 77 is caused to communicate with the second oil line 75b, the hydraulic brakes 60A, 60B being thereby applied.

In the low-pressure oil path selector valve 73, the oil pressure in the line oil path 75 that is produced while the electric oil pump 70 is operating in the high-pressure mode and which is inputted into the oil chamber 73c disposed at the right end of the selector valve 73 as seen in the figure is larger than the biasing force of the spring 73b. Therefore, the valve element 73a is positioned in the high-pressure side position, and the communication of the line oil path 75 with the first low-pressure oil path 76a is cut off, while the line oil path 75 is caused to communicate with the second low-pressure oil path 76b. By so doing, the oil in the line oil path 75 is supplied to the lubricating and cooling portion 91 via the second low-pressure oil path 76b while being reduced in pressure at the orifice 85b.

In this way, by controlling the operation mode (the operating state) of the electric oil pump 70 and the opening or closing of the solenoid valve 83, the ECU 45 releases or applies the hydraulic brakes 60A, 60B so as not only to put the motors 2A, 2B and the wheels Wr in a disconnected state or a connected state in a switching fashion but also to control the application force of the hydraulic brakes 60A, 60B.

Figure 12:
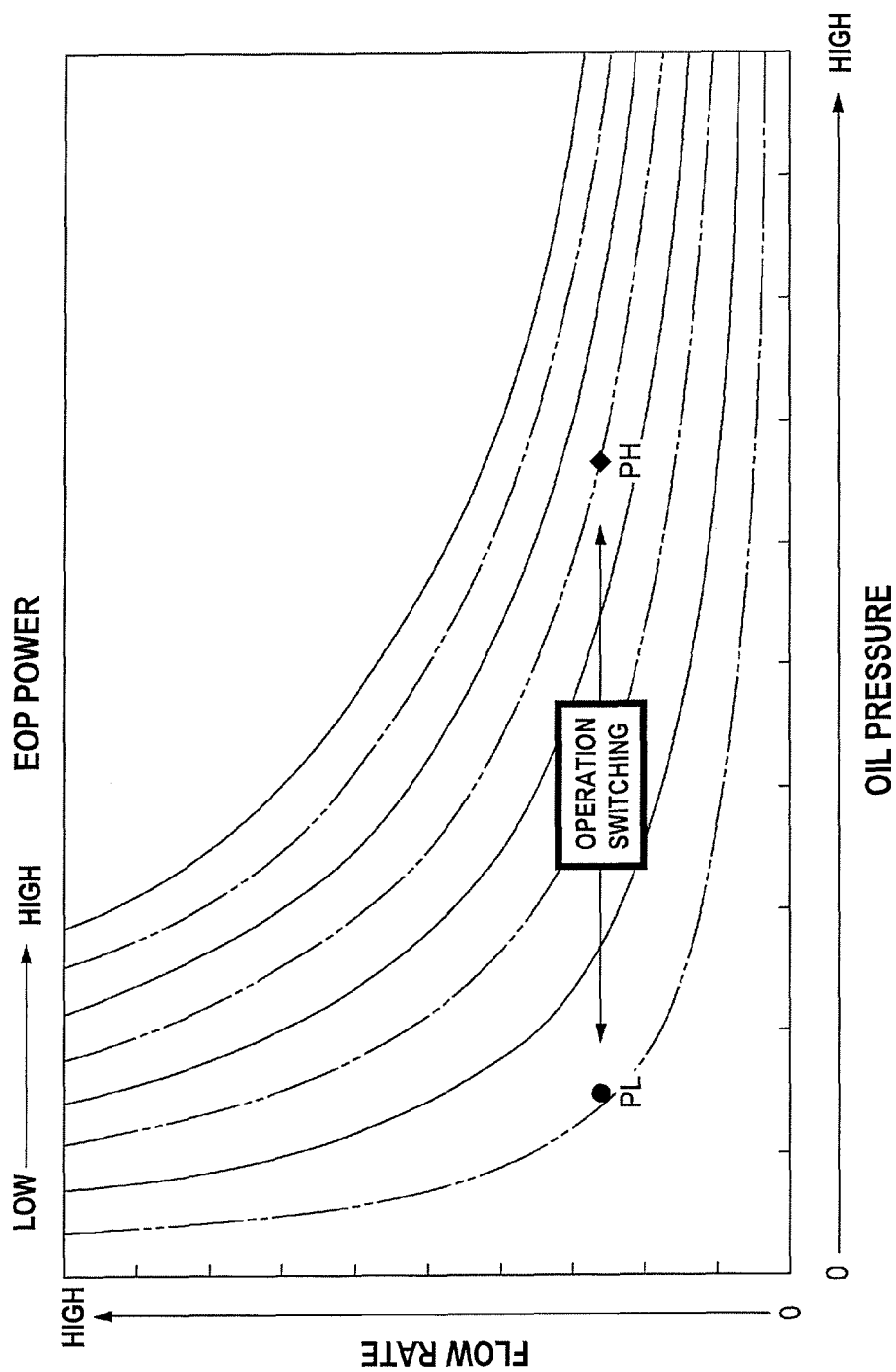
FIG. 12 is a graph showing load characteristics of an electric oil pump.

FIG. 12 is a graph showing load characteristics of the electric oil pump 70.

As shown in FIG. 12, compared with the high-pressure mode (with an oil pressure PH), in the low-pressure mode (with an oil pressure PL), the power of the electric oil pump 70 can be decreased to on the order of ¼ to ⅕, while maintaining the flow rate of supplied oil. Namely, the load of the electric oil pump 70 is small in the low-pressure mode, and the consumed power of the motor 90 that drives the electric oil pump 70 can be reduced compared with the high-pressure mode.

FIG. 13 is a table depicting a relation between the front-wheel drive system 6 and the rear-wheel drive system 1 in various vehicle states together with operating states of the motors 2A, 2B and states of the hydraulic circuit 71. In the figure, a front unit denotes the front-wheel drive system 6 and a rear unit denotes the rear-wheel drive system 1. Rear motors denote the motors 2A, 2B. EOP denotes the electric oil pump 70 and SOL denotes the solenoid 174. OWC denotes the one-way clutch 50, and BRK denotes the hydraulic brakes 60A, 60B. FIGS. 14 to 19 denote speed collinear diagrams of the rear-wheel drive system 1 in the various states. In each of the figures, S and C on a left-hand side denote the sun gear 21A of the epicyclic reduction gear 12A coupled to the motor 2A and the planetary carrier 23A coupled to the axle 10A, respectively. S and C on a right-hand side denote the sun gear 21B of the epicyclic reduction gear 12B coupled to the motor 2B and the planetary carrier 23B coupled to the axle 10B, respectively. R denotes the ring gears 24A, 24B, BRK denotes the hydraulic brakes 60A, 60B and OWC denotes the one-way clutch 50. In the following description, the rotating direction of the sun gears 21A, 21B that are rotated by the motors 2A, 2B when the vehicle travels forwards is referred to as a forward direction. In the figures, a portion above a line denoting a state in which the vehicle is stopped denotes a forward rotation, whereas a portion below the line denotes a backward rotation. Arrows directed upwards denote forward torque, whereas arrows directed downwards denote backward torque.

Figure 14:
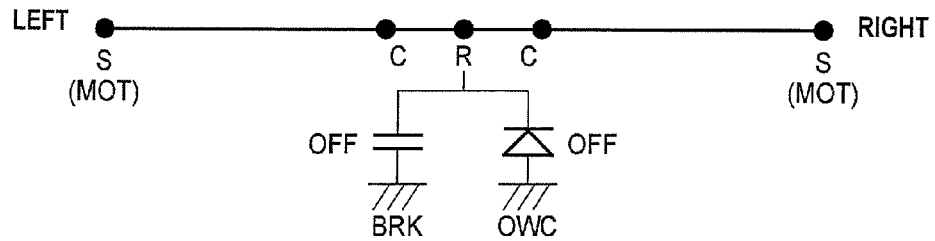
FIG. 14 is a speed collinear diagram of the rear-wheel drive system when the vehicle is stopped.

While the vehicle is stopped, neither the front-wheel drive system 6 nor the rear-wheel drive system 1 is driven. Consequently, as shown in FIG. 14, the motors 2A, 2B of the rear-wheel drive system 1 are stopped, and the axles 10A, 10B are also stopped. Therefore, no torque acts on any one of the elements. In the state in which the vehicle is stopped, in the hydraulic circuit 71, as shown in FIG. 5, the electric oil pump 70 is not operating, and the solenoid 174 of the solenoid valve 83 is de-energized. However, since no oil pressure is supplied, the hydraulic brakes 60A, 60B are released (OFF). Additionally, since the motors 2A, 2B are not driven, the one-way clutch 50 is not engaged (OFF).

Figure 15:
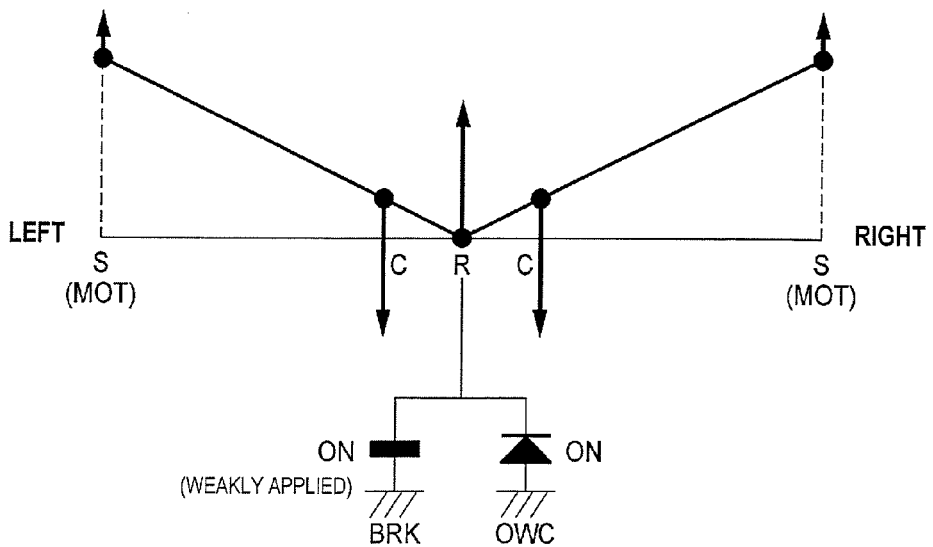
FIG. 15 is a speed collinear diagram of the rear-wheel drive system when the vehicle is traveling forward at low vehicle speeds.

Then, while the vehicle is traveling forwards at low vehicle speeds by EV start and EV cruise with good motor efficiency after the ignition is switched on, the vehicle is driven through rear-wheel drive by the rear-wheel drive system 1. As shown in FIG. 15, when the motors 2A, 2B are power driven so as to rotate in the forward direction, forward torque is applied to the sun gears 21A, 21B. As this occurs, as has been described before, the one-way clutch 50 is engaged, and the ring gears 24A, 24B are locked. By so doing, the planetary carriers 23A, 23B rotate in the forward direction, whereby the vehicle is allowed to travel forwards. Note that a running resistance from the axles 10A, 10B act on the planetary carries 23A, 23B in the backward direction. In this way, when the vehicle is started, the ignition is switched on and the torque of the motors 2A, 2B is increased, whereby the one-way clutch 50 is engaged mechanically, and the ring gears 24A, 24B are locked.

As this occurs, in the hydraulic circuit 71, as shown in FIG. 10, the electric oil pump 70 operates in the low-pressure mode (Lo), and the solenoid 174 of the solenoid valve 83 is de-energized, the hydraulic brakes 60A, 60B being thereby put in a weakly applied state. In this way, when forward rotational power at the motors 2A, 2B is inputted into the wheels Wr, the one-way clutch 50 is put in an engaged state, and the power transmission is enabled only by the one-way clutch 50. However, by keeping the hydraulic brakes 60A, 60B in the weakly applied state and also keeping the motors 2A, 2B and the wheels Wr in the connected state, even when the input of the forward rotational power from the motors 2A, 2B is temporarily decreased, thereby putting the one-way clutch 50 in a disengaged state, it is possible to restrain the power transmission between the motors 2A, 2B and the wheels Wr from being interrupted. Additionally, a revolution speed control is made unnecessary that would otherwise have to be carried out to put the motors 2A, 2B and the wheels Wr in the connected state when the vehicle is shifted to a regenerative deceleration, which will be described later. This application force of the hydraulic brakes 60A, 60B is weaker than an application force applied when the vehicle is shifted to the regenerative deceleration or when the vehicle is reversed. On the other hand, the consumed power that is consumed when the hydraulic brakes 60A, 60B are applied is reduced by making the application force of the hydraulic brakes 60A, 60B when the one-way clutch 50 is in the engaged state weaker than the application force of the hydraulic brakes 60A, 60B when the one-way clutch 50 is in the disengaged state. In this state, as has been described above, the oil in the oil path 75 is supplied to the lubricating and cooling portion 91 via the first low-pressure oil path 76a while being reduced in pressure at the orifice 85a, lubrication and cooling being thereby implemented by the lubricating and cooling portion 91.

Figure 16:
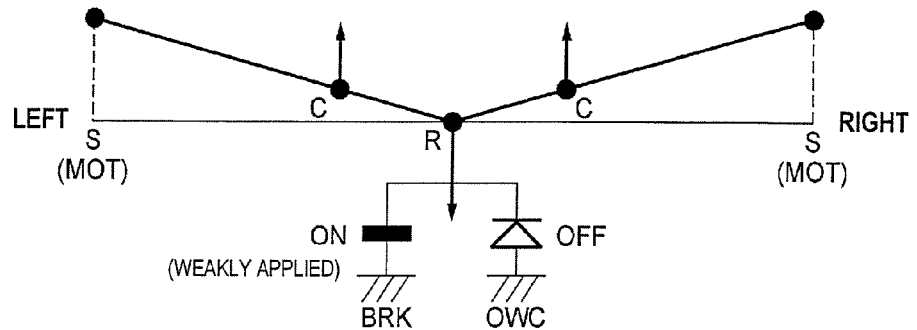
FIG. 16 is a speed collinear diagram of the rear-wheel drive system when the vehicle is traveling forward at intermediate vehicle speeds.

When the vehicle speed is increased from the state in which the vehicle is traveling forwards at low vehicle speeds, causing the vehicle to travel forwards at middle vehicle speeds, the driving of the vehicle is shifted from the rear-wheel drive by the rear-wheel drive system 1 to the front-wheel drive by the front-wheel drive system 6. As shown in FIG. 16, when the power driving of the motors 2A, 2B is stopped, forward torque attempting to drive the vehicle forwards is applied to the planetary carriers 23A, 23B from the axles 10A, 10B, and therefore, as has been described above, the one-way clutch 50 is put in the disengaged state.

As this occurs, in the hydraulic circuit 71, as shown in FIG. 10, the electric oil pump 70 operates in the low-pressure mode (Lo), and the solenoid 174 of the solenoid valve 83 is de-energized (OFF). Additionally, the hydraulic brakes 60A, 60B are in the weakly applied state. In this way, when the forward rotational power at the wheels Wr is inputted in the motors 2A, 2B, the one-way clutch 50 is in the disengaged state, and it is not possible to transmit the power only by the one-way clutch 50. However, by causing the hydraulic brakes 60A, 60B that are provided in parallel with the one-way clutch 50 to be applied weakly and keeping the motors 2A, 2B and the wheels Wr in the connected state, a power transmissive state can be maintained between the motors 2A, 2B and the wheels Wr, whereby a revolution speed control becomes unnecessary when the vehicle is shifted to the regenerative deceleration. Note that this application force of the hydraulic brakes 60A, 60B is also weaker than the application force applied when the vehicle is shifted to the regenerative deceleration or when the vehicle is reversed. In this state, as has been described above, the oil in the line oil path 75 is supplied to the lubricating and cooling portion 91 via the first low-pressure oil path 76a while being reduced in pressure at the orifice 85a, lubrication and cooling being thereby implemented by the lubricating and cooling portion 91.

Figure 17:
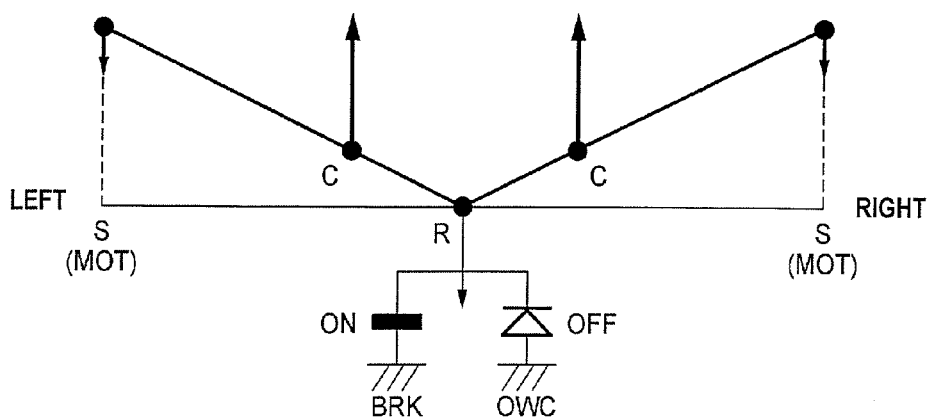
FIG. 17 is a speed collinear diagram of the rear-wheel drive system when the vehicle is decelerated for regeneration.

When the motors 2A, 2B are attempted to be driven for regeneration from the state depicted in FIG. 15, as shown in FIG. 17, the forward torque attempting to keep the vehicle traveling forwards is applied to the planetary carriers 23A, 23B from the axels 10A, 10B. Therefore, as has been described before, the one-way clutch 50 is put in the disengaged state.

As this occurs, in the hydraulic circuit 71, as shown in FIG. 11, the electric oil pump 70 operates in the high-pressure mode (Hi), and the solenoid 174 of the solenoid valve 83 is de-energized (OFF). Additionally, the hydraulic brakes 60A, 60B are put in the applied state (ON). Consequently, the ring gears 24A, 24B are fixed, and backward regenerative braking torque is applied to the motors 2A, 2B, whereby a regenerative deceleration is executed by the motors 2A, 2B. In this way, when the forward rotational power at the wheels Wr is inputted into the motors 2A, 2B, the one-way clutch 50 is put in the disengage state, and it is not possible to transmit the power only by the one-way clutch 50. However, by causing the hydraulic brakes 60A, 60B that are provided in parallel with the one-way clutch 50 to be applied and keeping the motors 2A, 2B and the wheels Wr in the connected state, a power transmissive state can be maintained between the motors 2A, 2B and the wheels Wr. Then, by controlling the motors 2A, 2B to be put in a regenerative drive state in this state, the energy of the vehicle can be regenerated. In this state, as has been described above, the oil in the line oil path 75 is supplied to the lubricating and cooling portion 91 via the second low-pressure oil path 76b while being reduced in pressure at the orifice 85b, lubrication and cooling being thereby implemented by the lubrication and cooling portion 91.

Following this, when the vehicle is accelerated, the vehicle is driven through four-wheel drive involving the front-wheel drive system 6 and the rear-wheel drive system 1. Then, the rear-wheel drive system 1 is in the same state as the state depicted in FIG. 15 that results when the vehicle is traveling forwards at low vehicle speeds, and the hydraulic circuit 71 is also put in the state shown in FIG. 10.

Figure 18:
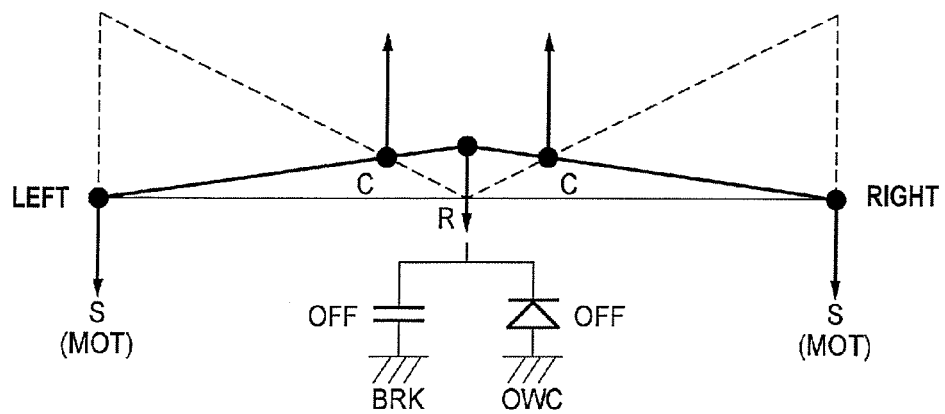
FIG. 18 is a speed collinear diagram of the rear-wheel drive system when the vehicle is traveling forward at high speeds.

When the vehicle travels forwards at high vehicle speeds, the vehicle is driven through front-wheel drive by the front-wheel drive system 6. As shown in FIG. 18, when the motors 2A, 2B are stopped being power driven, the forward torque attempting to cause the vehicle to travel forwards is applied to the planetary carriers 23A, 23B from the axles 10A, 10B. Therefore, as has been described before, the one-way clutch 50 is put in the disengaged state.

As this occurs, in the hydraulic circuit 71, as shown in FIG. 9, the electric oil pump 70 operates in the low-pressure mode (Lo), the solenoid 174 of the solenoid valve 83 is energized (ON), and the hydraulic brakes 60A, 60B are put in a released state (OFF). Consequently, the entrained rotation of the motors 2A, 2B is prevented, and the overspeed of the motors 2A, 2B is prevented when the vehicle travels forwards at high vehicle speeds by the front-wheel drive system 6. In this state, as has been described above, the oil in the line oil path 75 is supplied to the lubricating and cooling portion 91 via the first low-pressure oil path 76a while being reduced in pressure at the orifice 85a, lubrication and cooling being thereby implemented at the lubricating and cooling portion 91.

Figure 19:
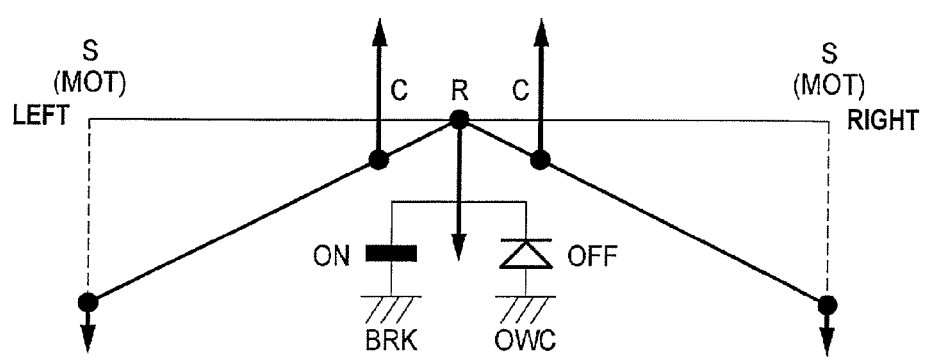
FIG. 19 is a speed collinear diagram of the rear-wheel drive system when the vehicle is reversed.

When the vehicle is reversed, as shown in FIG. 19, in the event that the motors 2A, 2B are power driven backwards, backward torque is given to the sun gears 21A, 21B. As this occurs, the one-way clutch 50 is put in the disengaged state as has been described before.

As this occurs, in the hydraulic circuit 71, as shown in FIG. 11, the electric oil pump 70 operates in the high-pressure mode (Hi), the solenoid 174 of the solenoid valve 83 is de-energized (OFF), and the hydraulic brakes 60A, 60B are put in the applied state. Consequently, the ring gears 24A, 24B are fixed, and the planetary carriers 23A, 23B are rotated backwards, whereby the vehicle is reversed. Note that the running resistance is applied in the forward direction to the planetary carriers 23A, 23B from the axles 10A, 10B. In this way, when the backward rotational power at the motors 2A, 2B is inputted into the wheels Wr, the one-way clutch 50 is put in the disengaged state, and it is not possible to transmit the power only by the one-way clutch 50. However, by causing the hydraulic brakes 60A, 60B that are provided in parallel with the one-way clutch 50 to be applied and keeping the motors 2A, 2B and the wheels Wr in the connected state, a power transmissive state can be maintained between the motors 2A, 2B and the wheels Wr, whereby the vehicle can be reversed by the rotational power of the motors 2A, 2B. In this state, as has been described above, the oil in the line oil path 75 is supplied to the lubricating and cooling portion 91 via the second low-pressure oil path 76b while being reduced in pressure at the orifice 85b, lubrication and cooling being thereby implemented by the lubricating and cooling portion 91.

In this way, in the rear-wheel drive system 1, the application and release of the hydraulic motors 60A, 60B is controlled according to the driving states of the vehicle, in other words, according to in which direction the motors 2A, 2B rotate; in the forward or backward direction and from which the power is inputted; from the motors 2A, 2B or the wheels Wr. Further, even when the hydraulic brakes 60A, 60B are in the applied state, the application force is adjusted.

Figure 20:
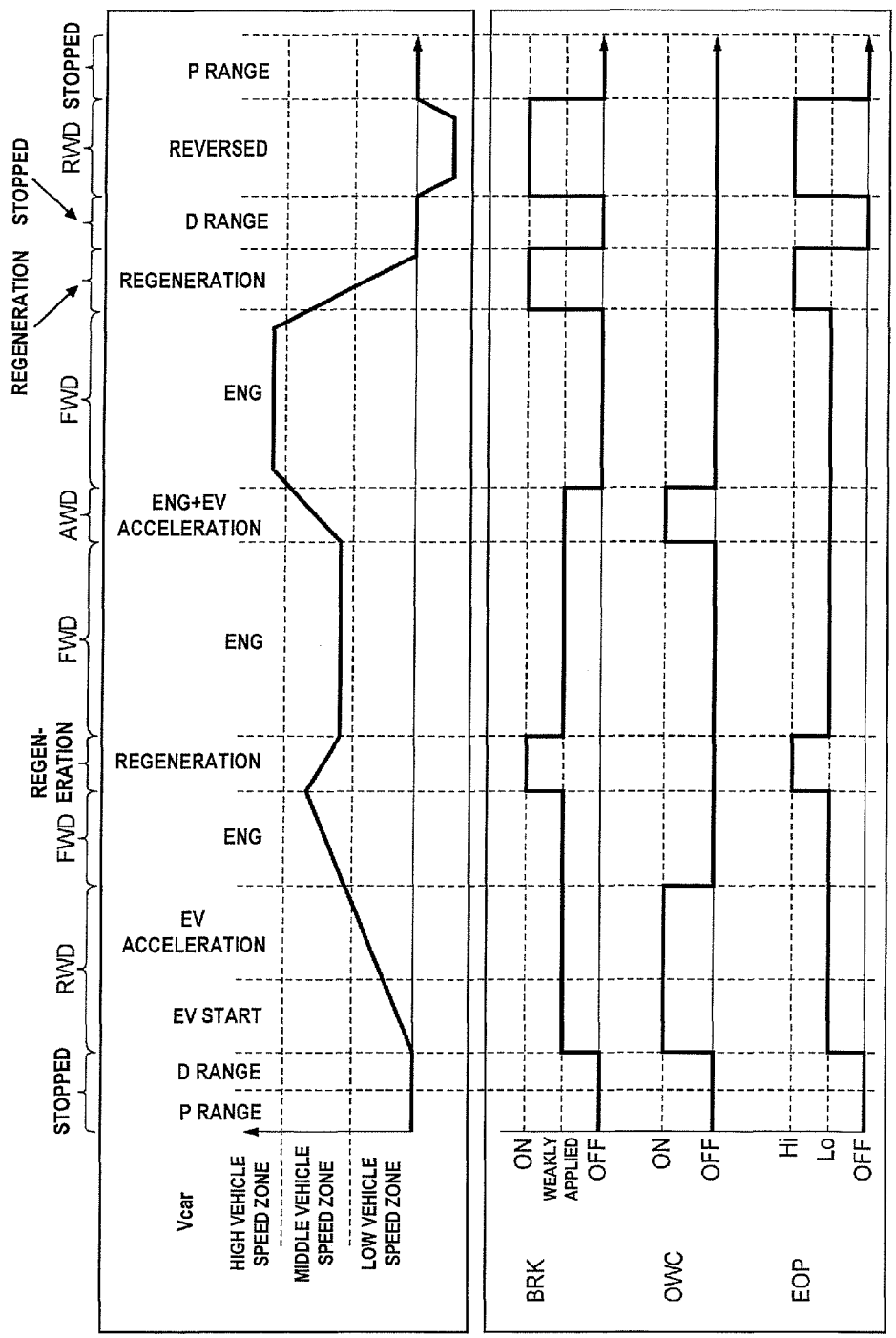
FIG. 20 is a timing chart while the vehicle is being driven.

FIG. 20 is a timing chart of the electric oil pump 70 (EOP), the one-way clutch 50 (OWC), and the hydraulic brakes 60A, 60B (BRK) from the time when the vehicle starts from a stopped state to the time when the vehicle stops again through events of EV start → EV acceleration → engine acceleration → regenerative deceleration → middle-speed cruising → high-speed cruising → regenerative deceleration → stop → reversing.

Firstly, the electric oil pump 70 is kept de-energized (OFF), the one-way clutch 50 is kept in the disengaged state (OFF) and the hydraulic brakes 60A, 60B are kept in the released state (OFF) until the ignition is switched on and the gear is then shifted from the P range to the D range. When the accelerator pedal is depressed in that state, EV start and EV acceleration are executed through rear-wheel drive (RWD) by the rear-wheel drive system 1. As this occurs, the electric oil pump 70 operates in the low-pressure mode (Lo), the one-way clutch 50 is engaged (ON), and the hydraulic brakes 60A, 60B are put in the weakly applied state. Then, when the vehicle speed is increased to reach a middle vehicle speed zone from a low vehicle speed zone and the driving of the vehicle is switched from rear wheel drive to front wheel drive, an ENG driving (FWD) by the internal combustion engine 4 is executed. As this occurs, the one-way clutch 50 is disengaged (OFF), while the electric oil pump 70 and the hydraulic brakes 60A, 60B are kept in the same states as before. Then, when a regenerative deceleration occurs in the vehicle with the brake pedal depressed, for example, the electric oil pump 70 operates in the high-pressure mode (Hi) and the hydraulic brakes 60A, 60B are applied (ON) while the one-way clutch 50 is kept disengaged (OFF). The same state as when the ENG driving is executed results while the middle speed cruising by the internal combustion engine 4 is executed. Following this, when the accelerator pedal is depressed further to switch the driving of the vehicle from front wheel drive to four or all wheel drive (AWD), the one-way clutch 50 is engaged (ON) again. Then, when the vehicle speed reaches a high vehicle speed zone from the middle vehicle speed zone, the ENG driving (FWD) by the internal combustion engine 4 is executed again. As this occurs, the one-way clutch 50 is disengaged (OFF), and the hydraulic brakes 60A, 60B are released (OFF) while the electric oil pump 70 is kept operating in the low-pressure mode (Lo). Following this, when a regenerative deceleration occurs in the vehicle, the same state results as when the regenerative deceleration occurred in the vehicle as described above. Then, when the vehicle stops, the electric oil pump 70 stops its operation (OFF), the one-way clutch 50 is disengaged (OFF), and the hydraulic brakes 60A, 60B are put in the released state (OFF).

Following this, when the vehicle is reversed, the electric oil pump 70 operates in the high-pressure mode (Hi) and the hydraulic brakes 60A, 60B are applied (ON) while the one-way clutch 50 is kept disengaged (OFF). Then, when the vehicle stops, the electric oil pump 70 stops again its operation (OFF), the one-way clutch 50 is disengaged (OFF), and the hydraulic brakes 60A, 60B are put in the released state (OFF).

In this way, by holding the hydraulic brakes 60A, 60B in the weakly applied state when the vehicle travels forwards at low vehicle speeds or middle vehicle speeds, even when a drive torque reduction is generated temporarily in the motors 2A, 2B, it is possible to restrain the power transmission between the motors 2A, 2B and the wheels Wr from being interrupted. Additionally, by keeping the hydraulic brakes 60A, 60B in the weakly applied state to hold the power transmissive state between the wheels Wr and the motors 2A, 2B, a revolution speed control is made unnecessary as when the motors 2A, 2B are shifted to the regenerative drive state.

When the vehicle is traveling forwards at high vehicle speeds, the overspeed of the motors 2A, 2B is prevented by releasing the hydraulic brakes 60A, 60B. Additionally, when the vehicle is traveling forwards at high vehicle speeds, the temperature of oil in the hydraulic circuit 71 is so high that the hydraulic brakes 60A, 60B can be applied quickly.

Figure 21:
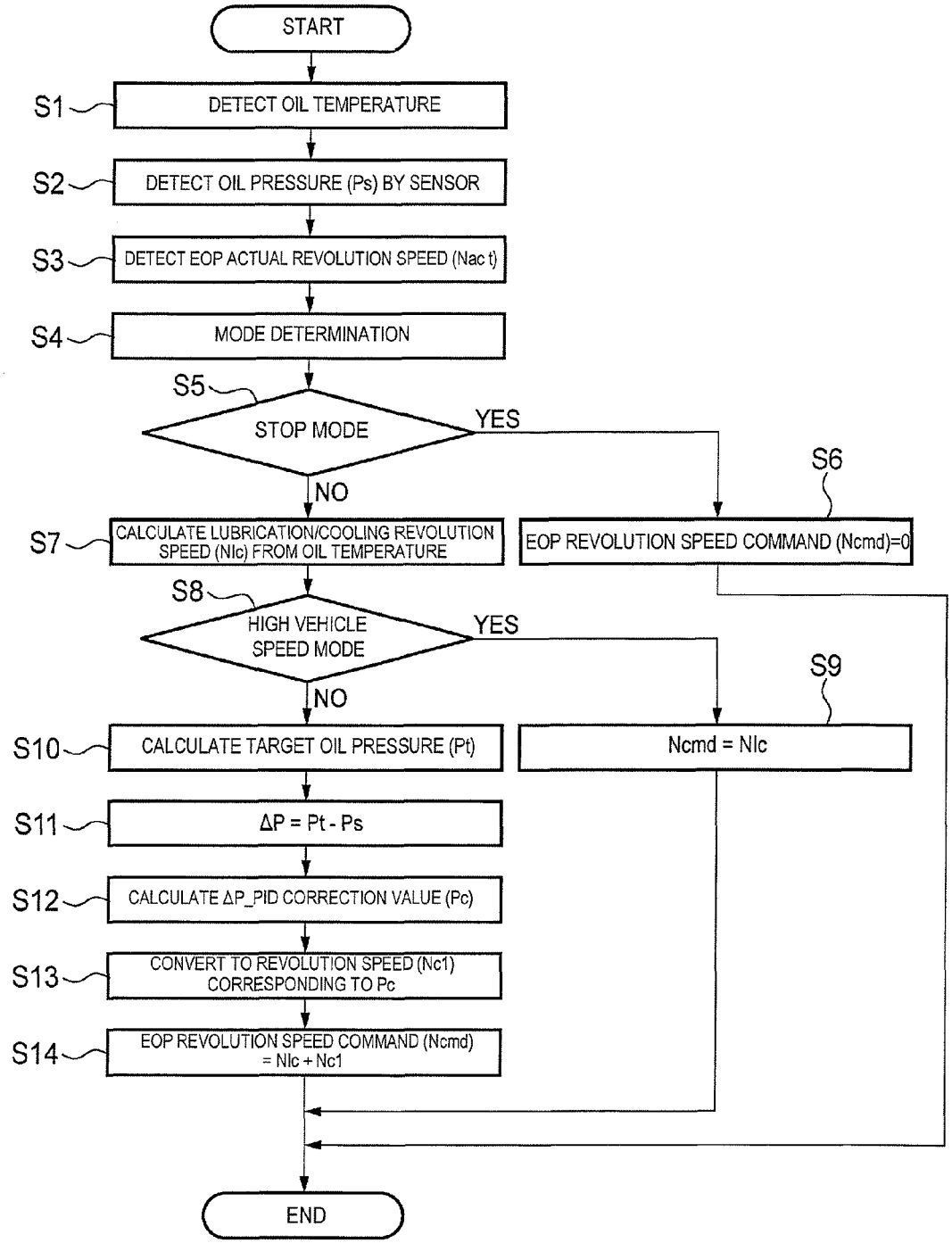
FIG. 21 is a flowchart showing a control flow of the electric oil pump.

Following this, the control of the electric oil pump 70 will be described by reference to FIG. 21.

Firstly, the temperature of oil in the hydraulic circuit 71 is detected by an oil temperature sensor, not shown (step S1), and following this, the oil pressure (Ps) in the hydraulic circuit 71 is detected by the pressure sensor 92 (step S2). Next, an EOP actual revolution speed (Nact) that is an actual revolution speed of the electric oil pump 70 is detected (step S3) to thereby execute a mode determination (step S4). Modes to be selected are made to correspond to the vehicle states depicted in FIG. 13 and are classified into a stop mode that corresponds to the state in which the vehicle is stopped and in which the hydraulic brakes 60A, 60B are released, a low vehicle speed and acceleration mode that corresponds to the states in which the vehicle travels at low vehicle speeds, the vehicle travels at middle vehicle speeds and the vehicle is accelerated and in which the hydraulic brakes 60A, 60B are applied weakly, a high vehicle speed mode that corresponds to the state in which the vehicle travels at high vehicle speeds and in which the hydraulic brakes 60A, 60B are released, a regeneration mode that corresponds to the regenerative deceleration and in which the hydraulic brakes 60A, 60B are applied, and a reverse mode that corresponds to the state in which the vehicle is reversed and in which the hydraulic brakes 60A, 60B are applied.

In the mode determination, whether or not the vehicle is in the stop mode is determined (step S5). If it is determined as a result of the determination that the vehicle is in the stop mode, a revolution speed command value (Ncmd) for the electric oil pump 70 is set to be zero in order to stop the electric oil pump 70 (step S6). On the contrary, if it is determined as a result of the determination that the vehicle is in any one of the modes other than the stop mode, a revolution speed (NIc) of the electric oil pump 70 is calculated which is necessary to supply a predetermined amount of oil to the lubricating and cooling portion 91 according to the oil temperature (step S7).

Following this, it is determined whether or not the vehicle is in the high vehicle speed mode (step S8). If it is determined as a result of the determination that the vehicle is in the high vehicle speed mode, in order to release the hydraulic brakes 60A, 60B, the revolution speed command value (Ncmd) of the electric oil pump 70 is set to a revolution speed (NIc) of the electric oil pump 70 that is necessary to supply a predetermined oil to the lubricating and cooling portion 91 (step S9). By so doing, a target oil pressure becomes zero from a low oil pressure (PL) resulting when the state of the hydraulic brakes 60A, 60B is shifted from the applied state to the released state and a PID correction value becomes negative, whereby it is avoided that the revolution speed of the electric oil pump 70 becomes lower than the revolution speed (NIc) of the electric oil pump 70 that is necessary to supply the predetermined amount of oil to the lubricating and cooling portion 91.

If it is determined as a result of the determination in step S8 that the vehicle is not in the high vehicle speed mode, a target oil pressure (Pt) is calculated (step S10). Namely, if the vehicle is in the low vehicle speed and acceleration mode, a predetermined low oil pressure (an oil pressure PL resulting when the vehicle operates in the low-pressure mode) is calculated at which the hydraulic brakes 60A, 60B are put in the weakly applied state. Additionally, if the vehicle is in the regeneration mode or the reverse mode, a predetermined high oil pressure (an oil pressure PH resulting when the vehicle operates in the high-pressure mode) is calculated at which the hydraulic brakes 60A, 60B are put in the applied state.

Next, a differential pressure (ΔP) that results from subtracting the oil pressure (Ps) in the hydraulic circuit 71 that is detected by the pressure sensor 92 from the calculated target oil pressure (Pt) is calculated (step S11), and a PID correction value (Pc) that is a PID correction value for the differential pressure (ΔP) is calculated (step S12). Then, a revolution speed (Ncl) of the electric oil pump 70 that corresponds to the PID correction value (Pc) is calculated based on a conversion relationship that is obtained in advance (step S13). Then, a value resulting from adding the revolution speed (Ncl) of the electric oil pump 70 that corresponds to the PID correction value (Pc) to the revolution speed (NIc) of the electric oil pump 70 that is necessary to supply the predetermined amount of oil to the lubricating and cooling portion 91 is set to the command value (Ncmd) of the revolution speed of the electric oil pump 70 (step S14). In this way, by adding the revolution speed (NIc) of the electric oil pump 70 that is necessary to supply the predetermined amount of oil to the lubricating and cooling portion 91, the deterioration in response due to a delay in feedback communication is suppressed.

Thus, as has been described heretofore, according to the embodiment, when the forward rotational power at the motors 2A, 2B is inputted into the wheels Wr, the ECU 45 applies the hydraulic brakes 60A, 60B so that the motors 2A, 2B and the wheels Wr are put in the connected state. When taking only the transmission of the rotational power into consideration, when the rotational power at the motors 2A, 2B is inputted into the wheels Wr, the one-way clutch 50 is put in the engaged state, and it becomes possible to transmit the power only by the one-way clutch 50. However, by applying the hydraulic brakes 60A, 60B in parallel and keeping the motors 2A, 2B and the wheels Wr in the connected state, it is possible to restrain the power transmission from being interrupted due to the one-way clutch 50 being put in the disengaged state when the input of the forward rotational power from the motors 2A, 2B is temporarily decreased. Additionally, since the one-way clutch 50 is provided in parallel with the hydraulic brakes 60A, 60B, the one-way clutch 50 is put in the engaged state when the forward rotational power at the motors 2A, 2B is inputted into the wheels Wr, thereby making it possible to prevent a delay in response. It is also possible not only to reduce the application force of the hydraulic brakes 60A, 60B but also to shorten the application time.

According to the embodiment, when the forward rotational power at the wheels Wr is inputted into the motors 2A, 2B, the ECU 45 applies the hydraulic brakes 60A, 60B so that the motors 2A, 2B and the wheels Wr are put in the connected state and controls the motors 2A, 2B to be put in the regenerative drive state or controls them to be put in the non-drive state. When the rotational power at the wheels Wr is inputted into the motors 2A, 2B, the one-way clutch 50 is put in the disengaged state, and it is not possible to transmit the power only by the one-way clutch 50. However, by applying the hydraulic brakes 60A, 60B that are provided in parallel with the one-way clutch 50 and keeping the motors 2A, 2B and the wheels Wr in the connected state, it is possible to maintain the power transmissive state between the motors 2A, 2B and the wheels Wr. In this state, by controlling the motors 2A, 2B to be put in the regenerative drive state, it is possible to regenerate the energy of the vehicle 3. Also, when controlling the motors 2A, 2B to be put in the non-drive state, by keeping the hydraulic brakes 60A, 60B applied, a revolution speed control becomes unnecessary that would otherwise be necessary to put the motors 2A, 2B and the wheels Wr in the connected state, whereby the response of the rear-wheel drive system 1 is increased.

According to the embodiment, the ECU 45 can control the application force of the hydraulic brakes 60A, 60B that are in the applied state. When the forward rotational power at the wheels Wr is inputted into the motors 2A, 2B, the ECU 45 controls the application force of the hydraulic brakes 60A, 60B so that an application force of the hydraulic brakes 60A, 60B when the motors 2A, 2B are in the non-drive state becomes weaker than an application force of the hydraulic brakes 60A, 60B when the motors 2A, 2B are in the regenerative drive state. When the forward rotational force at the wheels Wr is inputted into the motors 2A, 2B, that is, when the one-way clutch 50 is in the disengaged state, in the event that the motors 2A, 2B are controlled to be put in the regenerative drive state in that state, a large load is generated in the motors 2A, 2B due to regeneration. Therefore, in order to keep the wheels Wr and the motors 2A, 2B in the connected state, the hydraulic brakes 60A, 60B need to be applied strongly. When controlling the motors 2A, 2B to be put in the non-drive state, no large load is generated, and therefore, the hydraulic brakes 60A, 60B do not have to be applied strongly. Thus, by making an application force of the hydraulic brakes 60A, 60B when controlling the motors 2A, 2B to be put in the non-drive state weaker than an application force of the hydraulic brakes 60A, 60B when controlling the motors 2A, 2B to be put in the regenerative drive state, the consumed energy for application of the hydraulic brakes 60A, 60B can be reduced.

According to the embodiment, the ECU 45 controls the application force of the hydraulic brakes 60A, 60B so that an application force of the hydraulic brakes 60A, 60B when the forward rotational power at the motors 2A, 2B is inputted into the wheels Wr becomes weaker than an application force of the hydraulic brakes 60A, 60B when the forward rotational power at the wheels Wr is inputted into the motors 2A, 2B and the motors 2A, 2B are controlled to be put in the regenerative drive state. Since the construction is adopted in which the one-way clutch 50 and the hydraulic brakes 60A, 60B are provided in parallel, the application force of the hydraulic brakes 60A, 60B when the forward rotational power at the motors 2A, 2B is inputted into the wheels Wr, that is, when the one-way clutch 50 is in the engaged state can be made weaker than the application force of the hydraulic brakes 60A, 60B when the forward rotational power at the wheels Wr is inputted into the motors 2A, 2B and the ECU 45 controls the motors 2A, 2B to be put in the regenerative drive state, that is, when the one-way clutch 50 is in the disengaged state, thereby making it possible to decrease the consumed energy for application of the hydraulic brakes 60A, 60B.

According to the embodiment, when a backward rotational power at the motors 2A, 2B is inputted into the wheels Wr, the ECU 45 applies the hydraulic brakes 60A, 60B so that the motors 2A, 2B and the wheels Wr are put in the connected state. When the backward rotational power at the motors 2A, 2B is inputted into the wheels Wr, the one-way clutch 50 is put in the disengaged state, and it is not possible to transmit the power only by the one-way clutch 50. However, a power transmissive state can be maintained between the motors 2A, 2B and the wheels Wr by applying the hydraulic brakes 60A, 60B that are provided in parallel with the one-way clutch 50 and keeping the motors 2A, 2B and the wheels Wr in connected state, whereby the vehicle can be reversed.

According to the embodiment, the ECU 45 controls the application force of the hydraulic brakes 60A, 60B so that the application force of the hydraulic brakes 60A, 60B when the forward rotational force at the motors 2A, 2B is inputted into the wheels Wr becomes weaker than an application force of the hydraulic brakes 60A, 60B when the backward rotational power at the motors 2A, 2B is inputted into the wheels Wr. Since the construction is adopted in which the one-way clutch 50 and the hydraulic brakes 60A, 60B are provided in parallel with each other, the application force of the hydraulic brakes 60A, 60B when the forward rotational power at the motors 2A, 2B is inputted into the wheels Wr, that is, when the one-way clutch 50 is in the engaged state can be made weaker than the application force of the hydraulic brakes 60A, 60B when the backward rotational power at the motors 2A, 2B is inputted into the wheels Wr, that is, when the one-way clutch 50 is in the disengaged state, thereby making it possible to decrease the consumed energy for application of the hydraulic brakes 60A, 60B.

According to the embodiment, since the hydraulic brakes 60A, 60B that include the oil chambers for reserving the oil that is supplied by the electric oil pump 70 are adopted as the connection/disconnection unit, the application force and the surface areas to which the application force is applied can be adjusted according to the configurations and constructions of the oil paths and oil chambers. The overworking or underworking of the electric oil pump 70 can be suppressed by controlling the electric oil pump 70 based on the drive state of the motors 2A, 2B and/or the drive command of the motors 2A, 2B. By controlling the electric oil pump 70 based on the target oil pressures and the actual oil pressures in the oil chambers that are obtained by the pressure sensor 92, the application force of the hydraulic brakes 60A, 60B can be controlled more accurately. Note that in addition to the hydraulic connection/disconnection unit, a mechanical connection/disconnection unit may be used as the connection/disconnection unit.

According to the embodiment, since the construction is adopted in which the one-way clutch 50 and the hydraulic brakes 60A, 60B are provided in parallel with each other, an application force of the hydraulic brakes 60A, 60B when the motors 2A, 2B are power driven, that is, when the one-way clutch 50 is in the engaged state can be made weaker than an application force of the hydraulic brakes 60A, 60B when the motors are driven for regeneration or are power driven backwards, that is, when the one-way clutch 50 is in the disengaged state. Then, in accordance therewith, an operation capacity of the electric oil pump 70 when the motors 2A, 2B are power driven is made lower than an operation capacity of the electric oil pump 70 when the motors 2A, 2B are driven for regeneration. Additionally, an operation capacity of the electric oil pump 70 when the motors 2A, 2B are power driven is made lower than an operation capacity of the electric oil pump 70 when the motors 2A, 2B are power driven backwards. Thus, the consumed power can be decreased.

According to the embodiment, when the forward rotational power at the wheels Wr is inputted into the motors 2A, 2B, the hydraulic motors 60A, 60B are applied so that the motors 2A, 2B and the wheels Wr are put in the connected state. Then, when the vehicle speed reaches or exceeds the predetermined speed with the hydraulic brakes 60A, 60B kept applied, the applied hydraulic brakes 60A, 60B are released. Thus, the overspeed of the motors 2A, 2B can be prevented.

Second Embodiment

Figure 22:
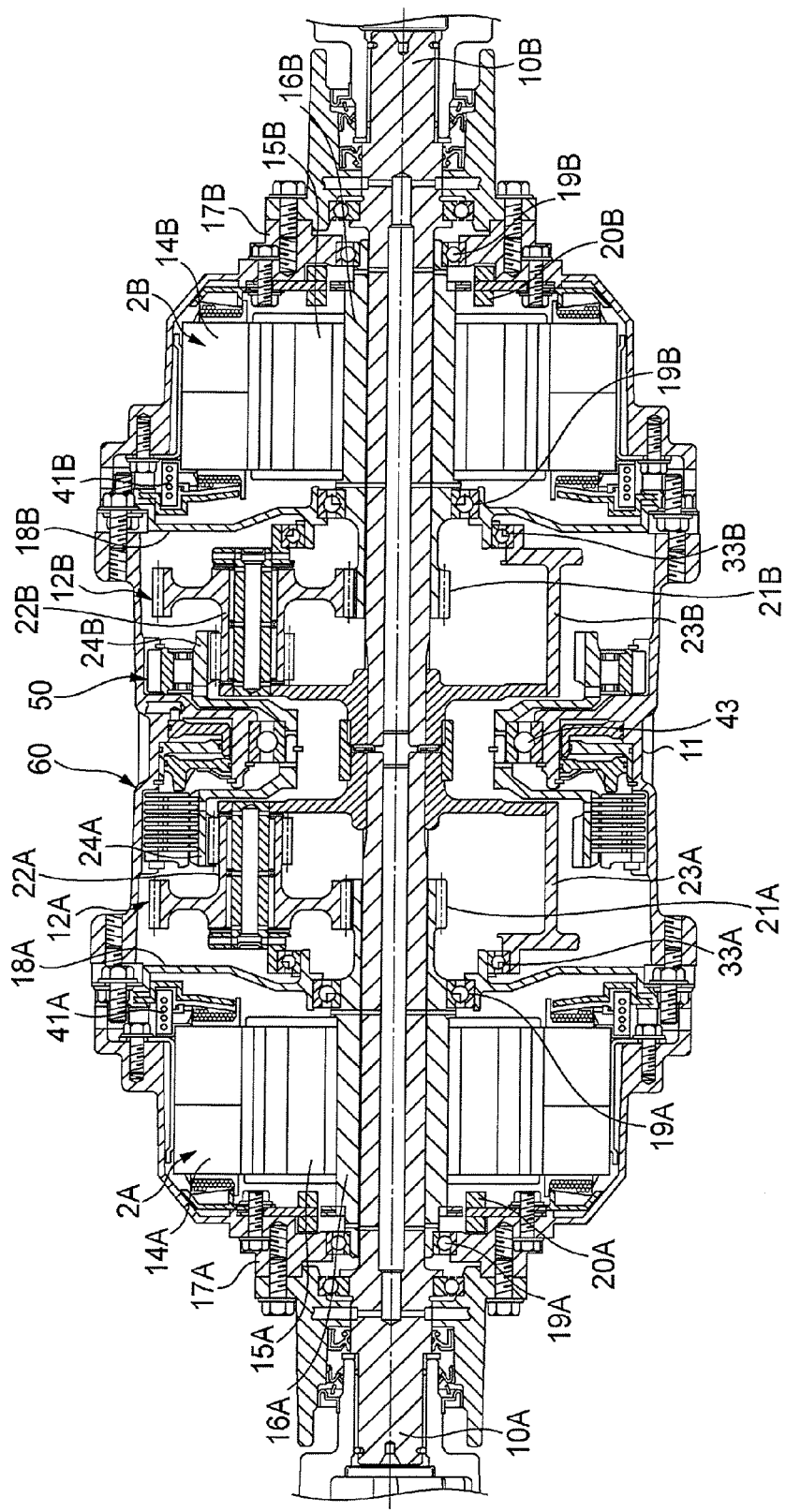
FIG. 22 is a vertical sectional view of a rear-wheel drive system of a second embodiment.
Figure 23:
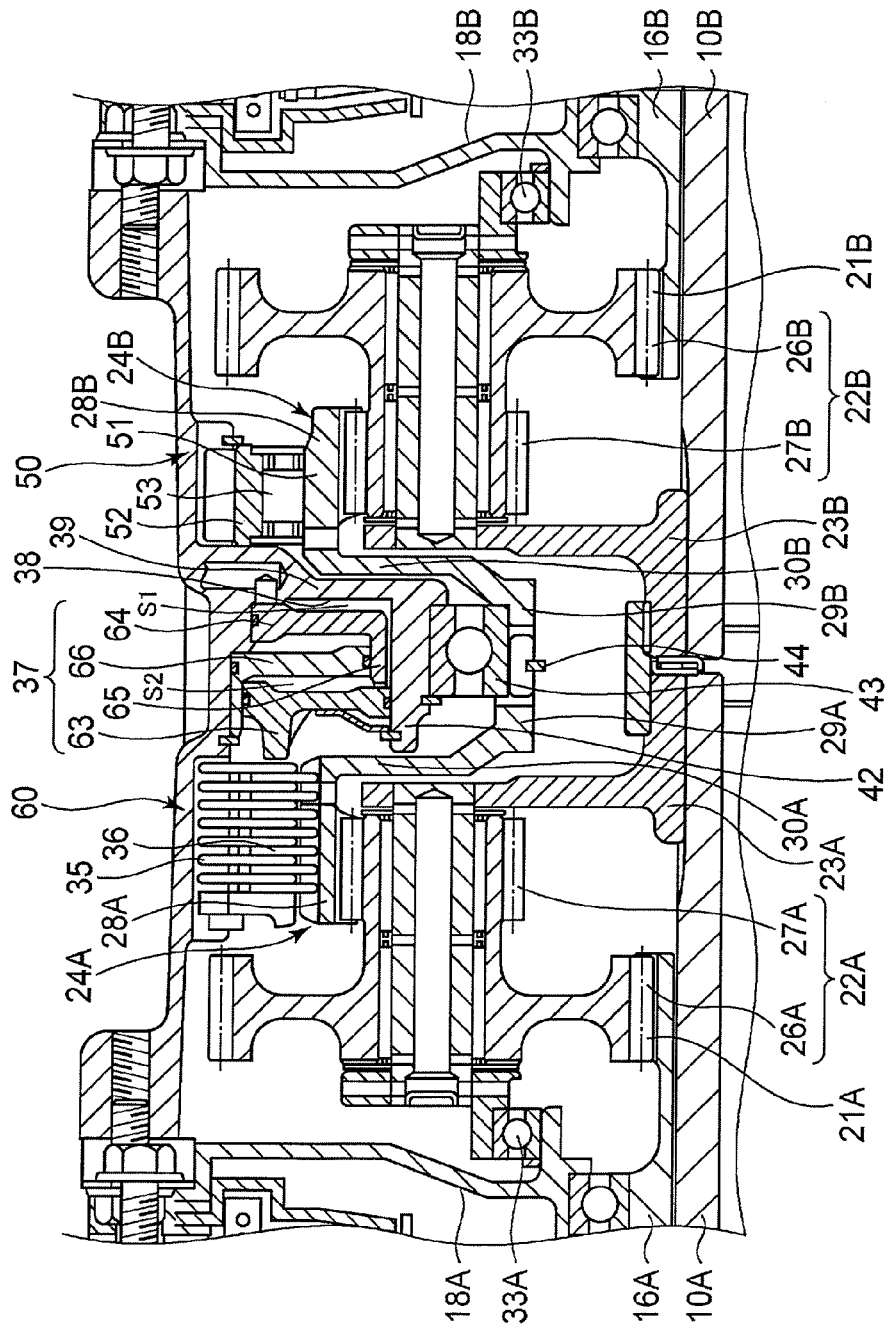
FIG. 23 is a partially enlarged view of the rear-wheel drive system shown in FIG. 22.

Next, a second embodiment of the invention will be described by reference to FIGS. 22 and 23. Note that a drive system of the second embodiment has the same configuration as that of the rear-wheel drive system 1 of the first embodiment except that the arrangement of a hydraulic brake and a one-way clutch differs from that of the first embodiment. Thus, giving the same or like reference numerals to the same or like portions to those of the first embodiment, the description of the same or like portions will be omitted.

In a rear-wheel drive system 1 of this embodiment, a cylindrical space portion is secured between a reduction gear case 11 and a ring gear 24A. Then, a hydraulic brake 60 is disposed in the space portion so as to overlap a first pinion 26A in a radial direction and overlap a second pinions 27A in an axial direction. In the hydraulic brake 60, a plurality of fixed plates 35 that spline fit on an inner circumferential surface of the reduction gear case 11 and a plurality of rotational plates 36 that spline fit on an outer circumferential surface of the ring gear 24A are disposed alternately, and these plates 35, 36 are operated to be engaged with and disengaged from each other by an annular piston 37. The piston 37 is accommodated in a reciprocating fashion in an annular cylinder compartment 38 that is formed between the reduction gear case 11, a support wall 45 and a cylindrical support portion 42. The piston 37 is caused to advance by introducing highly pressurized oil into the cylinder compartment 38, while the piston 37 is withdrawn by discharging the oil from the cylinder compartment 38.

More specifically, the piston 37 has a first piston wall 63 and a second piston wall 64 which are disposed forward and rearward of each other in an axial direction. These piston walls 63, 64 are connected together by a cylindrical inner circumferential wall 65. Consequently, an annular space that is opened radially outwards is formed between the first piston wall 63 and the second piston wall 64, and this annular space is partitioned axially horizontally by a partition member 66 that is fixed to an inner circumferential surface of an outer wall of the cylinder compartment 38. A space defined between a horizontally dividing wall 39 of the reduction gear case 11 and the second piston wall 64 is configured as a first hydraulic chamber S1 into which highly pressurized oil is introduced directly, and a space defined between the partition member 66 and the first piston wall 63 is configured as a second hydraulic chamber S2 that communicates with the first hydraulic chamber S1 by way of a through hole formed in the inner circumferential wall 65. A space defined between the second piston wall 64 and the partition member 66 communicates with the atmospheric pressure.

In this hydraulic brake 60, highly pressurized oil is introduced into the first hydraulic chamber S1 and the second hydraulic chamber S2, and the fixed plates 35 and the rotational plates 36 can be pressed against each other by virtue of the pressure of the oil that acts on the first piston wall 63 and the second piston wall 64. Consequently, a large pressure bearing surface area can be obtained by the first and second piston walls 63, 64 that are disposed forwards and rearwards of each other in the axial direction. Therefore, it is possible to obtain a large pressing force to be applied to the fixed plates 35 and the rotational plates 36 while suppressing an increase in radial surface area of the piston 37.

In the case of the hydraulic brake 60, the fixed plates 35 are supported on the reduction gear case 11, while the rotational plates 36 are supported on the ring gear 24A. Therefore, when both the plates 35, 36 are pressed against each other by the piston 37, a braking force is applied to the ring gear 24A and a ring gear 24B that are coupled to each other to fix them in place by virtue of frictional engagement produced between both the plates 35 and 36. Then, when the engagement of the plates implemented by the piston 37 is released, the ring gears 24A, 24B that are coupled together are permitted to rotate freely.

A cylindrical space portion is also secured between the reduction gear case 11 and the ring gear 24B, and a one-way clutch 50 is disposed in the space portion, the one-way clutch 50 being adapted to transmit only power acting in one direction on the ring gears 24A, 24B and to cut off power acting in the other direction. The one-way clutch 50 is such that a number of sprags 53 that are interposed between an inner race 51 and an outer race 52, and the inner race 51 spline is made integral with a part of a gear portion 28B of the ring gear 24B. The outer race 52 is positioned and restricted from rotation by the inner circumferential surface of the reduction gear case 11. The one-way clutch 50 is brought into engagement when a vehicle travels forwards so as to lock the rotation of the ring gears 24A, 24B. To describe this more specifically, the one-way clutch 50 is put in an engaged state when rotational power in a forward direction (a rotational direction when the vehicle 3 travels forwards) on a motors 2A, 2B side is inputted to a wheels Wr side, while the one-way clutch 50 is put in a disengaged state when backward rotational power at the motors 2A, 2B is inputted into the wheels Wr. The one-way clutch 50 is put in the disengaged state when forward rotational power at the wheels Wr is inputted into the motors 2A, 2B, while the one-way clutch 50 is put in the engaged state when backward rotational force at the wheels Wr is inputted into the motors 2A, 2B.

In the rear-wheel drive system 1 configured in this way, epicyclic reduction gears 12A, 12B are face oppositely each other in an axial direction at a central portion, the ring gear 24A of the epicyclic reduction gear 12A and the ring gear 24B of the epicyclic reduction gear 12B are coupled together, and the ring gears 24A, 24B are supported rotatably on a cylindrical support portion 42 of the reduction gear case 11 via a bearing 43. The single hydraulic brake 60 is provided in the space defined between a radially outward side of the epicyclic reduction gear 12A and the reduction gear case 11, and the single one-way clutch 50 is provided in the space defined between a radially outward side of the epicyclic reduction gear 12B and the reduction gear case 11. Then, the piston 37 that operates the hydraulic brake 60 is disposed between the hydraulic brake 60 and the one-way clutch 50 and on a radially outward side of the bearing 43.

Also, in the second embodiment configured in this way, the same operation and function as those of the rear-wheel drive system 1 of the first embodiment are provided. Additionally, since there should be provided only the single one-way clutch 50 and the single hydraulic brake 60, it is possible to realize a reduction in size and weight of the drive system, as well as a reduction in the number of components involved.

Note that the invention is not limited to the embodiments that have been described heretofore and hence can be modified or improved as required.

Figure 24:
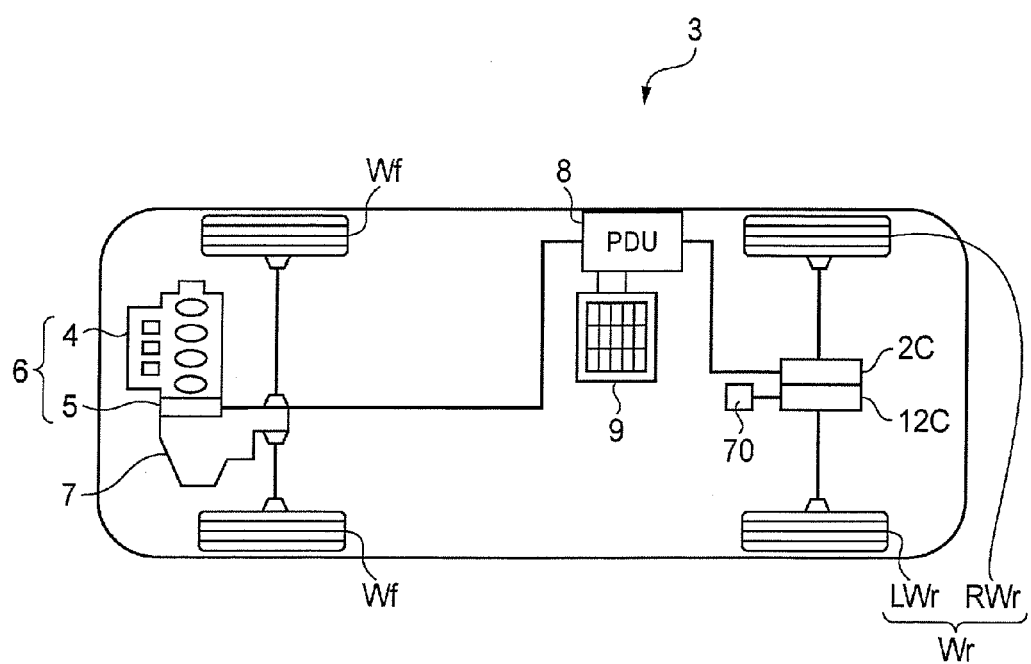
FIG. 24 is a block diagram showing a schematic configuration of a vehicle in which a rear-wheel drive system according to a modified example is mounted.
Figure 25:
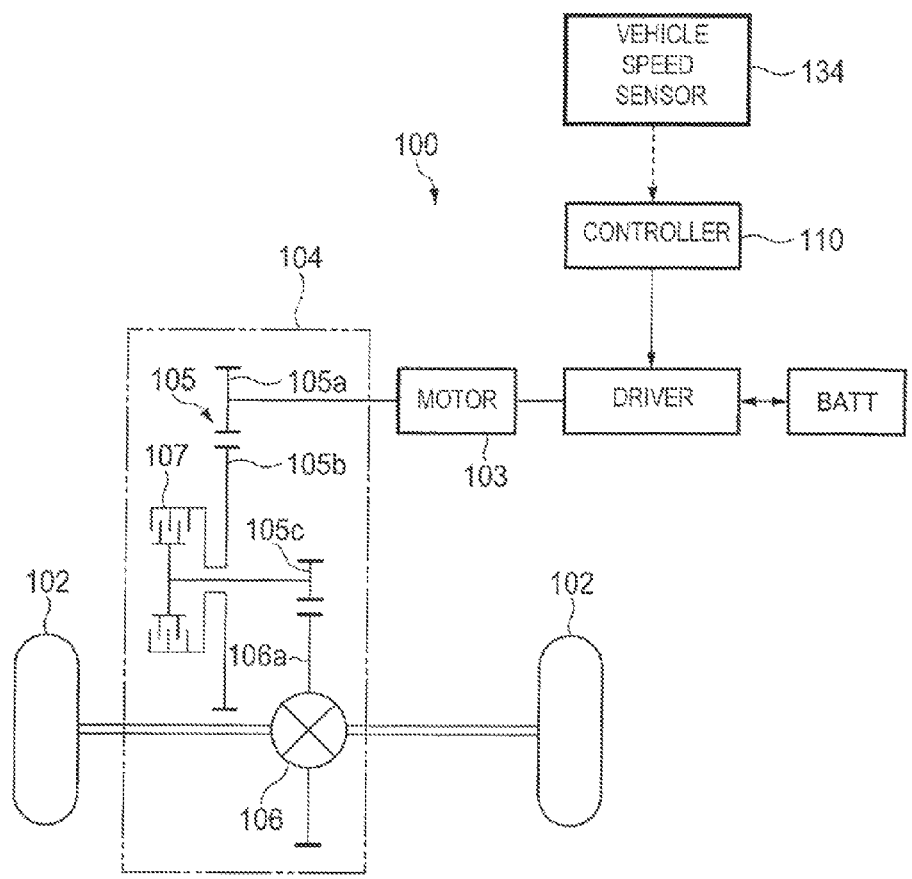
FIG. 25 is a schematic diagram of a vehicle drive system described in Patent Literature 1.

For example, in the rear-wheel drive systems 1 of the embodiments, the epicyclic reduction gears 12A, 12B are provided on the two motors 2A, 2B, respectively, so as to control the left rear wheel LWr and the right rear wheel RWr, respectively. However, the invention is not limited thereto, and hence, a configuration may be adopted in which as shown in FIG. 24, one motor 2C and one reduction gear 12C may be connected to a differential gear, not shown.

For example, in the rear-wheel drive systems 1 of the embodiments, the epicyclic reduction gears 12A, 12B are described as being provided, respectively, on the transmission lines between the motors 2A, 2B and the rear wheels Wr (RWr, LWr). However, the rear-wheel drive system 1 does not necessarily have to include a transmission such as the epicyclic reduction gears 12A, 12B.

Output shafts of the motors 2A, 2B and the axles 10A, 10B do not have to be disposed concentrically.

The front-wheel drive system 6 may be configured so that the motor 5 is provided as a single drive source without using the internal combustion engine 4.

The invention has been described in detail and by reference to the specific embodiments. However, it is obvious to those skilled in the art to which the invention pertains that various alterations or modifications can be made thereto without departing from the spirit and scope of the invention.

This patent application is based on Japanese Patent Application No. 2010-187541 filed on Aug. 24, 2010, the contents of which are incorporated herein by reference.

DESCRIPTION OF REFERENCE NUMERALS AND CHARACTERS

1 Rear-wheel drive system (Vehicle drive system)
2A, 2B, 2C Motor
10A, 10B Axle
12A, 12B Epicyclic reduction gear (Transmission)
21A, 21B Sun gear (Second rotational element)
23A, 23B Planetary carrier (Carrier, Third rotational element)
24A, 24B Ring gear (First rotational element)
45 ECU (Motor controller, Connection/disconnection unit controller)
50 One-way clutch
60A, 60B, 60 Hydraulic brake (Hydraulic connection/disconnection unit)
70 Electric oil pump (Hydraulic supply source)
71 Hydraulic circuit
92 Pressure sensor (Oil pressure detector)
LWr Left rear wheel (Wheel)
RWr Right rear wheel (Wheel)
Wr Rear wheel (Wheel)
S1 First hydraulic chamber (Oil chamber)
S2 Second hydraulic chamber (Oil chamber)

The invention claimed is:

1. A vehicle drive system including:
a motor that generates driving force to drive a vehicle;
a motor controller that controls the motor;
a connection/disconnection unit that is provided on a power transmission line between the motor and a wheel and which puts a motor side and a wheel side in a connected state or a disconnected state by being applied or released; and
a connection/disconnection unit controller that controls the connection/disconnection unit, the system further including:
a one-way transmission unit that is provided in parallel with the connection/disconnection unit on the power transmission line between the motor and the wheel and which is configured so that the one-way transmission unit is put in an engaged state when a forward rotational power on the motor side is inputted into the wheel side and is put in a disengaged state when a backward rotational power on the motor side is inputted into the wheel side, while the one-way transmission unit is put in the disengaged state when a forward rotational power on the wheel side is inputted into the motor side and is put in the engaged state when a backward rotational power on the wheel side is inputted into the motor side,
wherein the connection/disconnection unit controller causes the connection/disconnection unit to be applied so as to put the motor side and the wheel side in the connected state when the forward rotational power on the motor side is inputted into the wheel side.

2. The system of claim 1,
wherein the connection/disconnection unit controller causes the connection/disconnection unit to be applied so as to put the motor side and the wheel side in the connected state when the forward rotational power on the wheel side is inputted into the motor side.

3. The system of claim 2,
wherein the motor controller controls the motor to be put in a regenerative drive state when the forward rotational power on the wheel side is inputted into the motor side.

4. The system of claim 2,
wherein in addition to switching between the connected state and the disconnected state, the connection/disconnection unit controller controls an application force by which the connection/disconnection unit is applied when in an applied state,
wherein the motor controller controls the motor to be put in a regenerative drive state or a non-drive state when the forward rotational power on the wheel side is inputted into the motor side, and
wherein the connection/disconnection unit controller controls an application force of the connection/disconnection unit when the motor is in the non-drive state so as to be weaker than an application force of the connection/disconnection unit when the motor is in the regenerative drive state.

5. The system of claim 4,
wherein the connection/disconnection unit is a hydraulic connection/disconnection unit that includes an oil chamber which reserves an oil supplied by a hydraulic supply source, and
wherein the connection/disconnection unit controller controls the application force of the connection/disconnection unit when in the applied state by adjusting a hydraulic pressure in the oil chamber by controlling an operating state of the hydraulic supply source.

6. The system of claim 2,
wherein the motor controller controls the motor to be put in a regenerative drive state when the forward rotational power on the wheel side is inputted into the motor side,
wherein in addition to switching between the connected state and the disconnected state, the connection/disconnection unit controller controls an application force by which the connection/disconnection unit is applied when in an applied state, and
wherein the connection/disconnection unit controller controls an application force of the connection/disconnection unit when the forward rotational power on the motor side is inputted into the wheel side so as to be weaker than an application force of the connection/disconnection unit when the forward rotational power on the wheel side is inputted into the motor side and the motor controller controls the motor to be put in the regenerative drive state.

7. The system of claim 1,
wherein the connection/disconnection unit controller causes the connection/disconnection unit to be applied so as to put the motor side and the wheel side in the connected state when the backward rotational force on the motor side is inputted into the wheel side.

8. The system of claim 7,
wherein in addition to switching between the connected state and the disconnected state, the connection/disconnection unit controller controls an application force by which the connection/disconnection unit is applied when in an applied state, and
wherein the connection/disconnection unit controller controls an application force of the connection/disconnection unit when the forward rotational power on the motor side is inputted into the wheel side so as to be weaker than an application force of the connection/disconnection unit when the backward rotational power on the motor side is inputted into the wheel side.

9. The system of claim 1,
wherein a transmission that changes a revolution speed of the motor and a rotation speed of the wheel is provided on the power transmission line between the motor and the wheel,
wherein the transmission includes an epicyclic transmission that is made up of three rotational elements, and
wherein the one-way transmission unit and the connection/disconnection unit are connected to a first rotational element that is one of the three rotational elements of the transmission.

10. The system of claim 9,
wherein in the three rotational elements, the motor is connected to a second rotational element, and the wheel is connected to a third rotational element.

11. The system of claim 10,
wherein in the epicyclic transmission, the first rotational element is made up of a ring gear, the second rotational element is made up of a sun gear, and the third rotational element is made up of a carrier.

12. The system of claim 9,
wherein the motor includes a first and second motors which are disposed left and right in a width direction of the vehicle,
wherein the rotational power of the first motor is transmitted to a left wheel, and
wherein the rotational power of the second motor is transmitted to a right wheel.

13. The system of claim 9,
wherein the motor includes a first and second motors which are disposed left and right in a width direction of the vehicle,
wherein the transmission includes a first and second transmissions which are disposed left and right in the width direction of the vehicle,
wherein the rotational power of the first motor is transmitted to a left wheel via the first transmission,
wherein the rotational power of the second motor is transmitted to a right wheel via the second transmission,
wherein the first motor and the first transmission are disposed in that order from an outer side in the width direction, and
wherein the second motor and the second transmission are disposed in that order from an outer side in the width direction.

14. The system of claim 13,
wherein each of the first transmission and the second transmission includes the first rotation element, and
wherein the one-way transmission unit and the connection/disconnection unit are connected to the first rotational element of the first transmission and the first rotational element of the second transmission which are disposed left and right in the width direction of the vehicle.

15. The system of claim 13,
wherein each of he first transmission and the second transmission includes the first rotation element, and
wherein the first rotational element of the first transmission and the first rotational element of the second transmission are coupled to each other.

16. The system of claim 15,
wherein the one-way transmission unit is provided commonly for the first rotational element of the first transmission and the first rotational element of the second transmission which are coupled together.

17. The system of claim 15,
wherein the connection/disconnection unit is provided commonly for the first rotational element of the first transmission and the first rotational element of the second transmission which are coupled together.

18. A vehicle drive system including:
a motor that generates driving force to drive a vehicle; a motor controller that controls the motor;
a connection/disconnection unit that is provided on a power transmission line between the motor and a wheel and which puts a motor side and a wheel side in a connected state or a disconnected state by being applied or released; and
a connection/disconnection unit controller that controls the connection/disconnection unit,
the system further including:
a one-way transmission unit that is provided in parallel with the connection/disconnection unit on the power transmission line between the motor and the wheel and which is configured so that the one-way transmission unit is put in an engaged state when a forward rotational power on the motor side is inputted into the wheel side and is put in a disengaged state when a backward rotational power on the motor side is inputted into the wheel side, while the one-way transmission unit is put in the disengaged state when a forward rotational power on the wheel side is inputted into the motor side and is put in the engaged state when a backward rotational power on the wheel side is inputted into the motor side, wherein the connection/disconnection unit controller causes the connection/disconnection unit to be applied so as to put the motor side and the wheel side in the connected state when the forward rotational power on the wheel side is inputted into the motor side and causes the connection/disconnection unit applied to be released when a vehicle speed reaches or exceeds a predetermined speed with the motor side and the vehicle side staying in the connected state.

19. The system of claim 18, wherein the connection/disconnection unit is a hydraulic connection/disconnection unit that includes an oil chamber which reserves an oil supplied by a hydraulic supply source, wherein the hydraulic supply source functions as a supply source for a cooling medium for cooling the motor, and wherein an operation of the hydraulic supply source is not stopped when the connection/disconnection unit controller causes the connection/disconnection unit to be released.

* * * * *